US012088934B2

(12) United States Patent
Kitano

(10) Patent No.: US 12,088,934 B2
(45) Date of Patent: Sep. 10, 2024

(54) IMAGE PICKUP ELEMENT AND IMAGE PICKUP METHOD

(71) Applicant: SONY SEMICONDUCTOR SOLUTIONS CORPORATION, Kanagawa (JP)

(72) Inventor: Shin Kitano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/003,808

(22) PCT Filed: Jul. 2, 2021

(86) PCT No.: PCT/JP2021/025194
§ 371 (c)(1),
(2) Date: Dec. 29, 2022

(87) PCT Pub. No.: WO2022/009807
PCT Pub. Date: Jan. 13, 2022

(65) Prior Publication Data
US 2023/0262349 A1 Aug. 17, 2023

(30) Foreign Application Priority Data
Jul. 10, 2020 (JP) ................................. 2020-119454

(51) Int. Cl.
*H04N 25/47* (2023.01)
*H04N 25/702* (2023.01)
(Continued)

(52) U.S. Cl.
CPC ............. *H04N 25/47* (2023.01); *H04N 25/77* (2023.01)

(58) Field of Classification Search
CPC ...... H04N 25/74; H04N 25/75; H04N 25/767; H04N 25/702; H04N 25/707; H04N 25/47; H04N 25/77
See application file for complete search history.

(56) References Cited

U.S. PATENT DOCUMENTS 9,824,296 B2 * 11/2017 Yamanaka ........... G06V 10/758
11,792,547 B2 * 10/2023 Puchades ............... H04N 25/40
(Continued)

FOREIGN PATENT DOCUMENTS

JP  2009-516476 A   4/2009
JP  2016-533140 A   10/2016
(Continued)

OTHER PUBLICATIONS

International Search Report and Written Opinion of PCT Application No. PCT/JP2021/025194, issued on Aug. 31, 2021, 08 pages of ISRWO.

*Primary Examiner* — Marly S Camargo
(74) *Attorney, Agent, or Firm* — CHIP LAW GROUP

(57) ABSTRACT

To suppress occurrence of a delay in detection of a valid address event to be originally detected. An image pickup element includes a plurality of pixels (100), a pixel address event detection unit (120), a region address event detection unit (320), and a pixel selection unit (310). The pixel (100) includes a photoelectric conversion unit (110) that performs photoelectric conversion of incident light. The pixel address event detection unit (120) is arranged in each pixel and detects a pixel address event that is an address event of a pixel itself. The pixel address event is detected based on a change amount of charge generated by the photoelectric conversion. The region address event detection unit (320) detects a region address event that is an address event in a predetermined region. The region address event is detected based on a change in a charge amount generated by the
(Continued)

photoelectric conversion in a plurality of pixels in the predetermined region among the plurality of pixels. The pixel selection unit (310) selects the pixel (100) based on the detected pixel address event and region address event, and causes the selected pixel to output a detection result of the pixel address event.

15 Claims, 17 Drawing Sheets

(51) Int. Cl.
*H04N 25/707* (2023.01)
*H04N 25/74* (2023.01)
*H04N 25/75* (2023.01)
*H04N 25/767* (2023.01)
*H04N 25/77* (2023.01)

(56) References Cited

U.S. PATENT DOCUMENTS

| | | | |
|---|---|---|---|
| 2014/0125994 A1* | 5/2014 | Kim | G06F 1/3243 |
| | | | 356/601 |
| 2017/0059399 A1* | 3/2017 | Suh | H04N 25/75 |
| 2018/0167575 A1* | 6/2018 | Watanabe | H04N 25/75 |
| 2023/0059890 A1* | 2/2023 | Hanada | H01L 27/14643 |
| 2024/0040278 A1* | 2/2024 | Suess | H04N 25/74 |

FOREIGN PATENT DOCUMENTS

| | | |
|---|---|---|
| JP | 2017-531865 A | 10/2017 |
| JP | 2020-072471 A | 5/2020 |

\* cited by examiner

IMAGE PICKUP ELEMENT AND IMAGE PICKUP METHOD

CROSS REFERENCE TO RELATED APPLICATIONS

This application is a U.S. National Phase of International Patent Application No. PCT/JP2021/025194 filed on Jul. 2, 2021, which claims priority benefit of Japanese Patent Application No. JP 2020-119454 filed in the Japan Patent Office on Jul. 10, 2020. Each of the above-referenced applications is hereby incorporated herein by reference in its entirety.

FIELD

The present disclosure relates to an image pickup element and an image pickup method.

BACKGROUND

In recent years, there has been used an asynchronous image pickup apparatus in which an address event detection circuit is provided in each pixel. The address event detection circuit detects in real time an address event that is a light quantity of the pixel exceeding a threshold.

When an occurrence of the address event is detected, each address event detection circuit outputs a request signal for requesting an output of a detection signal indicating the occurrence of the address event to an arbitration circuit called an arbiter. The arbiter gives a selection right to the address event detection circuit in the order of early transmission of the request signal, and enables output of a light receiving element signal (for example, Patent Literature 1).

CITATION LIST

Patent Literature

Patent Literature 1: JP 2016-533140 A

SUMMARY

Technical Problem

However, since the above-described image pickup apparatus is arbitrated in the order of early detection of address event, generation of an image based on an address event with high priority may be delayed although such address event is detected. Specifically, even in a case where a valid address event that is to be originally detected, such as an event accompanying movement of an observation target, is detected, an address event caused by noise or the like that is detected first is preferentially processed. For this reason, there is a problem that a delay occurs in detection of the valid address event to be originally detected.

Therefore, the present disclosure proposes an image pickup element and an image pickup method capable of suppressing occurrence of a delay in detection of the valid address event that is to be originally detected.

Solution to Problem

To solve the problems described above, an image pickup element according to an embodiment of the present disclosure includes: a plurality of pixels provided with a photoelectric conversion unit that performs photoelectric conversion of incident light; a pixel address event detection unit that is arranged in each of the plurality of pixels and detects a pixel address event, the pixel address event being an address event of the each of the plurality of pixels and being detected based on a change in a charge amount generated by the photoelectric conversion; a region address event detection unit that detects a region address event, the region address event being an address event in a predetermined region and being detected based on a change in a charge amount generated by photoelectric conversion in a plurality of pixels included in the predetermined region among the plurality of pixels; and a pixel selection unit that selects a pixel among the plurality of pixels based on the pixel address event detected and the region address event detected, and causes the pixel selected to output a detection result of the pixel address event.

DESCRIPTION OF EMBODIMENTS

Hereinafter, embodiments of the present disclosure will be described with reference to the drawings. The description will be given in the following order. In each of the following embodiments, same parts are given the same reference signs to omit redundant description.
1. First embodiment
2. Second embodiment
3. Third embodiment
4. Fourth embodiment First Embodiment

[Configuration of Image Pickup Apparatus]

Figure 1:
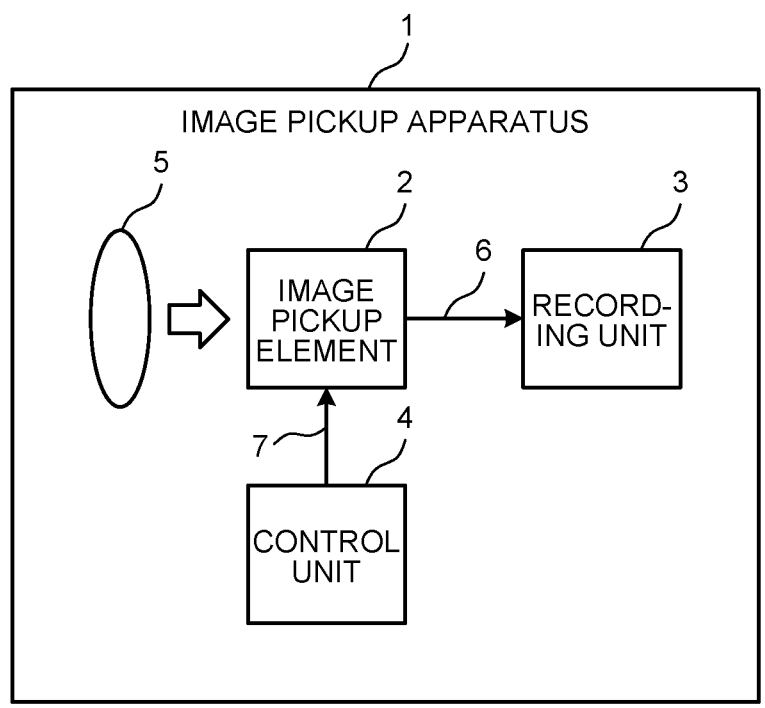
FIG. 1 is a block diagram illustrating a configuration example of an image pickup apparatus according to embodiments of the present disclosure.

FIG. 1 is a block diagram illustrating a configuration example of an image pickup apparatus according to embodiments of the present disclosure. FIG. 1 illustrates the configuration example of an image pickup apparatus 1.

The image pickup apparatus 1 according to the embodiments includes an image pickup lens 5, an image pickup element 2, a recording unit 3, and a control unit 4. The image pickup apparatus 1 is assumed to be a camera mounted on a wearable device, an in-vehicle camera, or the like.

The image pickup lens 5 is an example of an optical system, and captures incident light from a subject to form an image on an image pickup surface of the image pickup element 2.

The image pickup element 2 is also referred to as an event-based vision sensor (EVS), and detects, for each of a plurality of pixels, an address event that is an absolute value of a luminance change amount exceeding a threshold. The address event includes, for example, an on-event indicating that a luminance increase amount exceeds an upper limit threshold and an off-event indicating that a luminance decrease amount falls below a lower limit threshold less than the upper limit threshold.

Then, the image pickup element 2 generates a detection signal indicating a detection result of the address event for each pixel. Each of the detection signals includes an on-event detection signal $V_{CH}$ (FIG. 6) indicating presence or absence of the on-event and an off-event detection signal $V_{CL}$ (FIG. 6) indicating presence or absence of the off-event.

Furthermore, the image pickup element 2 further generates an image signal for each pixel in which the detection signal is generated. Predetermined signal processing such as an image recognition process is performed on the image signal generated, and image data after the process is output to the recording unit 3 via a signal line 6.

The recording unit 3 records the image data from the image pickup element 2. The control unit 4 controls the image pickup element 2 to cause the image pickup element 2 to capture the image data. At this time, the control unit 4 outputs a control signal to the image pickup element 2 via a signal line 7.

[Configuration of Image Pickup Element]

Figure 2:
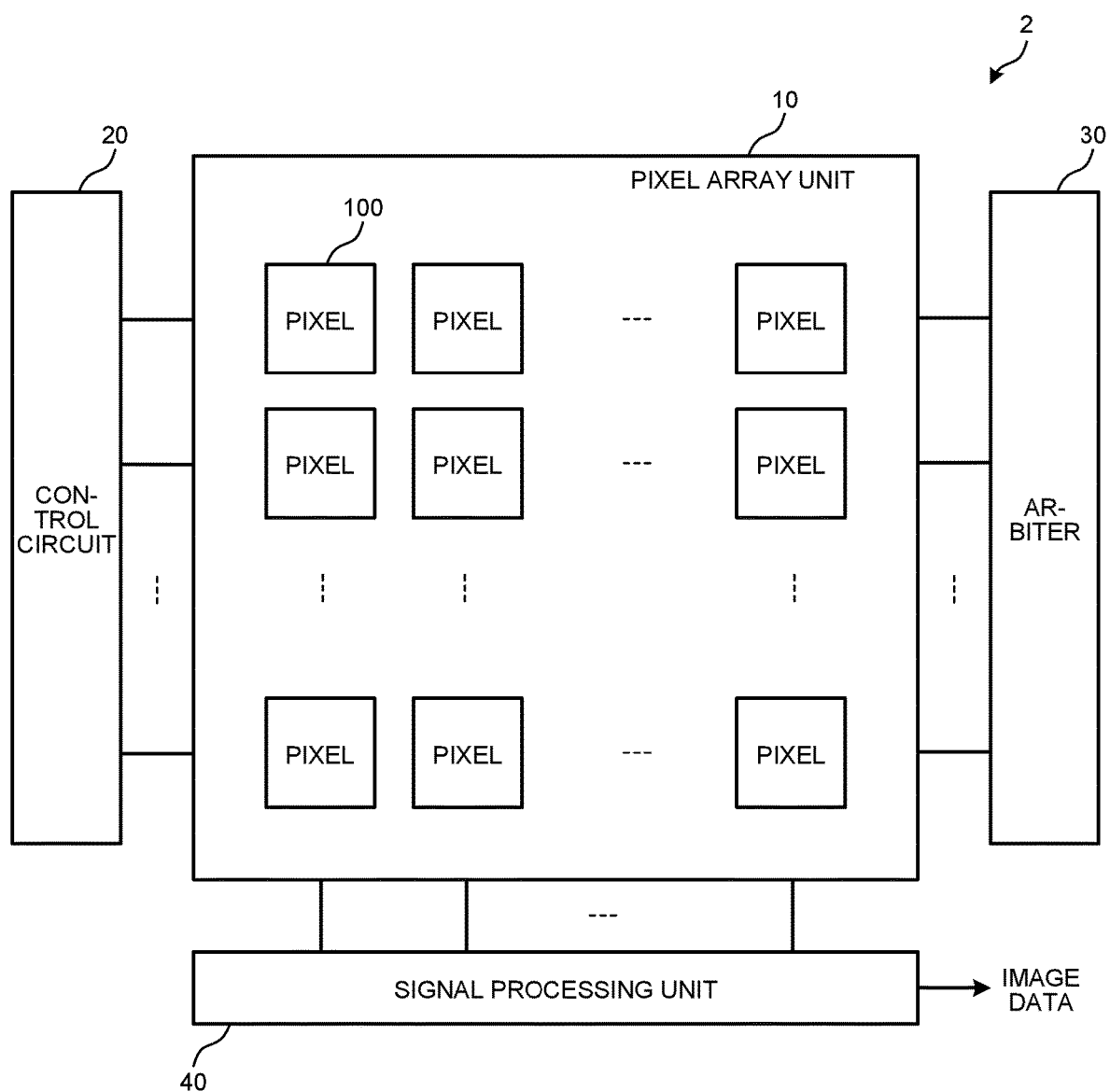
FIG. 2 is a diagram illustrating a configuration example of an image pickup element according to the embodiments of the present disclosure.

FIG. 2 is a block diagram illustrating a configuration example of the image pickup element according to the embodiments of the present disclosure. FIG. 2 is a block diagram illustrating the configuration example of the image pickup element 2. The image pickup element 2 in FIG. 2 includes a pixel array unit 10, a control circuit 20, an arbiter 30, and a signal processing unit 40.

The pixel array unit 10 is configured by arranging a plurality of pixels 100. The pixel array unit 10 in FIG. 2 illustrates an example in which the pixels 100 are arranged in a two-dimensional matrix. Each of the pixels 100 includes a photoelectric conversion unit that performs photoelectric conversion of incident light, and detects the address event based on a change amount of charge generated by the photoelectric conversion. Hereinafter, the address event detected in the pixel 100 is referred to as a pixel address event.

The pixel 100 that has detected the pixel address event outputs a detection signal of the pixel address event to the control circuit 20 and the signal processing unit 40 described later. The control circuit 20 outputs a control signal to the pixel 100 that has output the detection signal to reset the pixel address event detected in the pixel 100. Furthermore, the signal processing unit 40 performs the predetermined signal processing on the detection signal.

Prior to the output of the detection signal, the pixel 100 transmits a request, to the arbiter 30 to be described later, for outputting the detection signal. The arbiter 30 selects the pixel 100 that has transmitted the request and outputs a response to the request. This response permits the output of the detection signal.

The arbiter 30 selects the pixel 100 based on the pixel address event described above and a region address event. Here, the region address event is an address event detected based on the change amount of charge generated by the photoelectric conversion of pixels 100 included in a predetermined region among the plurality of pixels 100 arranged in the pixel array unit 10. This region address event can be detected, for example, based on a change amount of total charge generated by the pixels 100 included in the predetermined region. Details of the configuration of the pixel 100 will be described later.

The control circuit 20 is a circuit that controls resetting of the pixel address event in each pixel 100 of the pixel array unit 10. The control circuit 20 resets a pixel address event detection unit 120 by outputting a control signal for resetting a subtractor 123 of the pixel address event detection unit 120 arranged in the pixel 100 described later.

The arbiter 30 selects the pixel 100 that has transmitted the request. The arbiter 30 selects the pixel 100 based on the pixel address event and the region address event as described above. As described above, the pixel 100 that has detected the address event outputs the detection signal to the control circuit 20 and the signal processing unit 40. It is necessary to exclusively supply the control signal to one pixel 100. This is to prevent collision at the time of outputting detection signals in the plurality of pixels 100. Therefore, the arbiter 30 arbitrates the plurality of pixels 100 having detected the pixel address event. Specifically, the arbiter 30 selects one pixel 100 from the pixels 100 that have detected the pixel address event, and returns a response to the pixel 100 selected. This response represents a result of the selection.

When requests are transmitted from the plurality of pixels 100, the arbiter 30 can select the pixels 100 in the order that the request has been transmitted. Here, the arbiter 30 can preferentially select a specific pixel 100. For example, the arbiter 30 can preferentially select the pixel 100 included in the region where the above-described region address event has been detected over the pixels 100 not included in the region. The region where the region address event is detected is a region where a change in luminance of incident light is detected in many pixels 100. In this region, it can be estimated that a change such as a movement has occurred in a subject of the image pickup element 2. In other words, it is estimated that the address event such as an event accompanying the movement of an observation target is detected in the region. Therefore, by preferentially selecting the pixel 100 in this region, it is possible to acquire, at an early stage, an image of the observation target accompanied by the movement.

On the other hand, the response is output to the pixel 100 not selected by the arbiter 30 after completing the generation of the image signal of the pixel 100 included in the region where the region address event has been detected. For example, the pixel 100 in which the pixel address event has been detected due to influence of noise or the like can be given a lower priority. Details of a configuration of the arbiter 30 will be described later.

The signal processing unit 40 performs the predetermined signal processing on the detection signal from the pixel 100. For example, the signal processing unit 40 can arrange the detection signals as image signals in the two-dimensional matrix and generate the image data having two-bit information for each pixel 100. Furthermore, the signal processing unit 40 can perform signal processing such as the image recognition process on the image data generated.

[Configuration of Pixel Array Unit and Arbiter]

Figure 3:
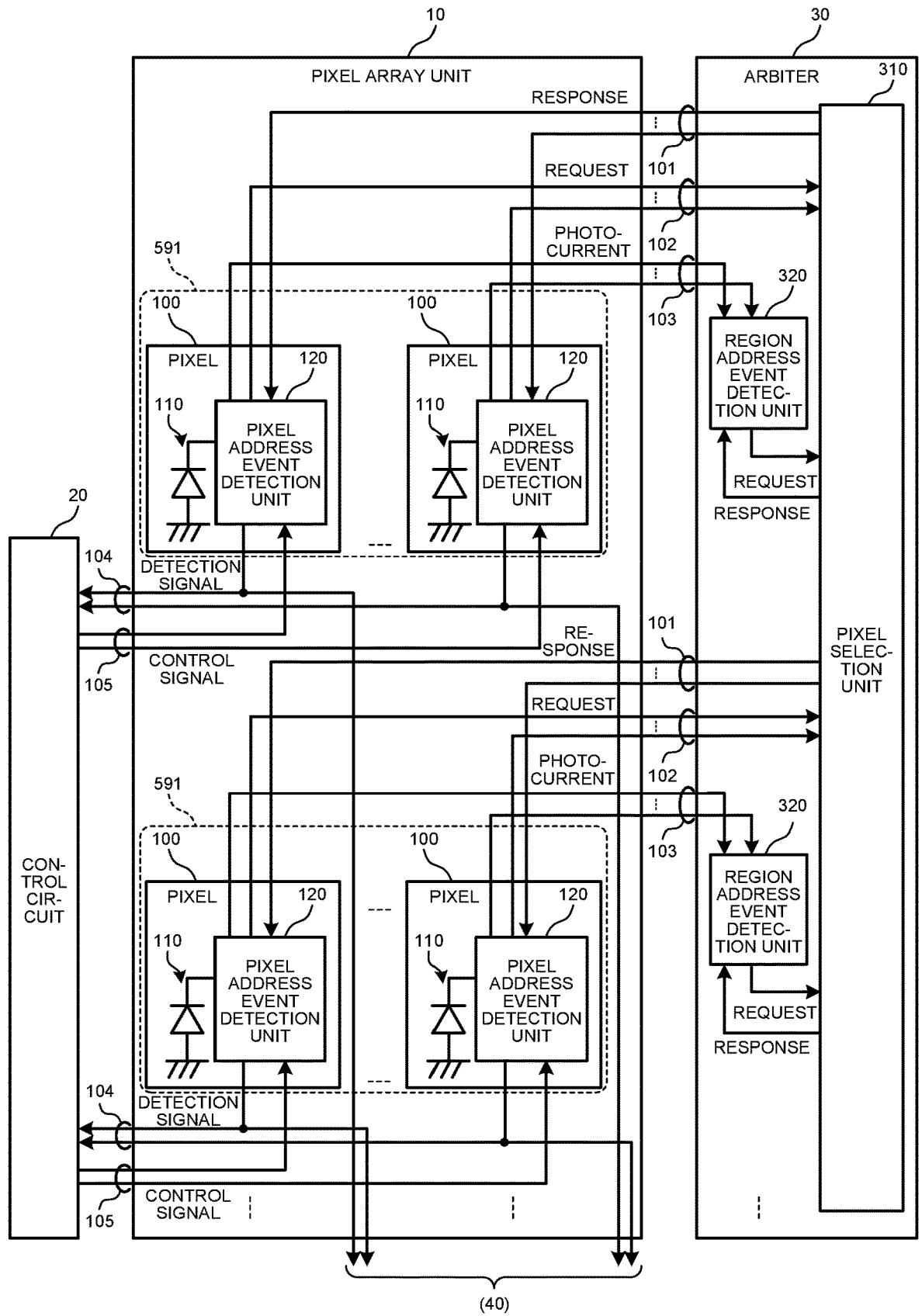
FIG. 3 is a diagram illustrating a configuration example of a pixel array unit and an arbiter according to a first embodiment of the present disclosure.

FIG. 3 is a diagram illustrating a configuration example of the pixel array unit and the arbiter according to the first embodiment of the present disclosure. FIG. 3 illustrates the configuration example of the pixel array unit 10 and the arbiter 30. The pixel 100 of the pixel array unit 10 in FIG. 3 includes a photoelectric conversion unit 110 and a pixel address event detection unit 120.

The photoelectric conversion unit 110 performs photoelectric conversion of incident light. The photoelectric conversion unit 110 can include a photodiode. By this photoelectric conversion, a charge corresponding to the luminance of the incident light is generated. By applying a voltage to the photoelectric conversion unit 110, a photocurrent that is a current corresponding to the generated charge can be supplied to an external circuit.

The pixel address event detection unit 120 detects the pixel address event. By detecting a change in the photocurrent described above, the change in the charge generated by the photoelectric conversion can be detected, and the pixel address event can be detected based on the change amount of charge. Furthermore, the pixel address event detection unit 120 supplies the photocurrent of the photoelectric conversion unit 110 to a region address event detection unit 320. Details of the configuration of the pixel address event detection unit 120 will be described later.

The arbiter 30 in FIG. 3 includes the region address event detection unit 320 and a pixel selection unit 310.

The region address event detection unit 320 detects the region address event that is the address event in a predetermined region among the plurality of pixels 100 of the pixel array unit 10 based on a change amount of charge generated by the photoelectric conversion of the pixels 100 included in the region. This region address event can be detected, for example, based on a change in the photocurrent in all the pixels 100 included in the predetermined region, and can be detected based on the change in the total photocurrent of all the pixels 100 included in the region. Note that the pixel array unit 10 in FIG. 3 illustrates an example in which a region 591, which is the above-described predetermined region, is arranged for each row of the pixels 100 in the two-dimensional matrix. The region address event detection unit 320 is arranged for each region 591, and the photocurrent is supplied from the pixels 100 included in the region. This photocurrent is supplied via a signal line 103. Details of the configuration of the region address event detection unit 320 will be described later.

The pixel selection unit 310 selects the pixel 100 based on the pixel address event and the region address event. Furthermore, the pixel selection unit 310 causes the selected pixel 100 to output the detection result of the pixel address event. The pixel selection unit 310 may select the pixel 100 for which the pixel address event is detected from the pixels 100 included in the region 591 for which the region address event is detected.

The exchange of signals in the pixel 100 and the like will be described with reference to FIG. 3. When the pixel address event detection unit 120 of the pixel 100 detects the pixel address event, the request for outputting the detection signal of the pixel address event is output to the pixel selection unit 310. This request is output via a signal line 102. Furthermore, the region address event detection unit 320 outputs the request to the pixel selection unit 310 when detecting the region address event in its own region 591. The pixel selection unit 310 selects the pixel 100 based on the pixel address event and the region address event, and outputs the response to the pixel 100 selected. This response is output via a signal line 101.

The pixel 100 to which the response is output from the pixel selection unit 310 outputs the detection signal of the pixel address event to the signal processing unit 40 and the control circuit 20. This detection signal is output via a signal line 104. The control circuit 20 outputs the control signal to the pixel 100 that has output the detection signal, so as to reset the pixel 100. As a result, the detection of the pixel address event in the pixel 100 is reset, and the output of the request is stopped.

Furthermore, the pixel selection unit 310 also outputs a response to the region address event detection unit 320 of the region 591 including the selected pixel 100. The region address event detection unit 320 to which the response is output is reset, and the output of the request is stopped.

Note that the configuration of the region 591 is not limited to this example. For example, the region 591 can be set for each of a plurality of rows such as every two rows of the pixels 100 arranged in the pixel array unit 10.

[Configuration of Pixel Address Event Detection Unit]

Figure 4:
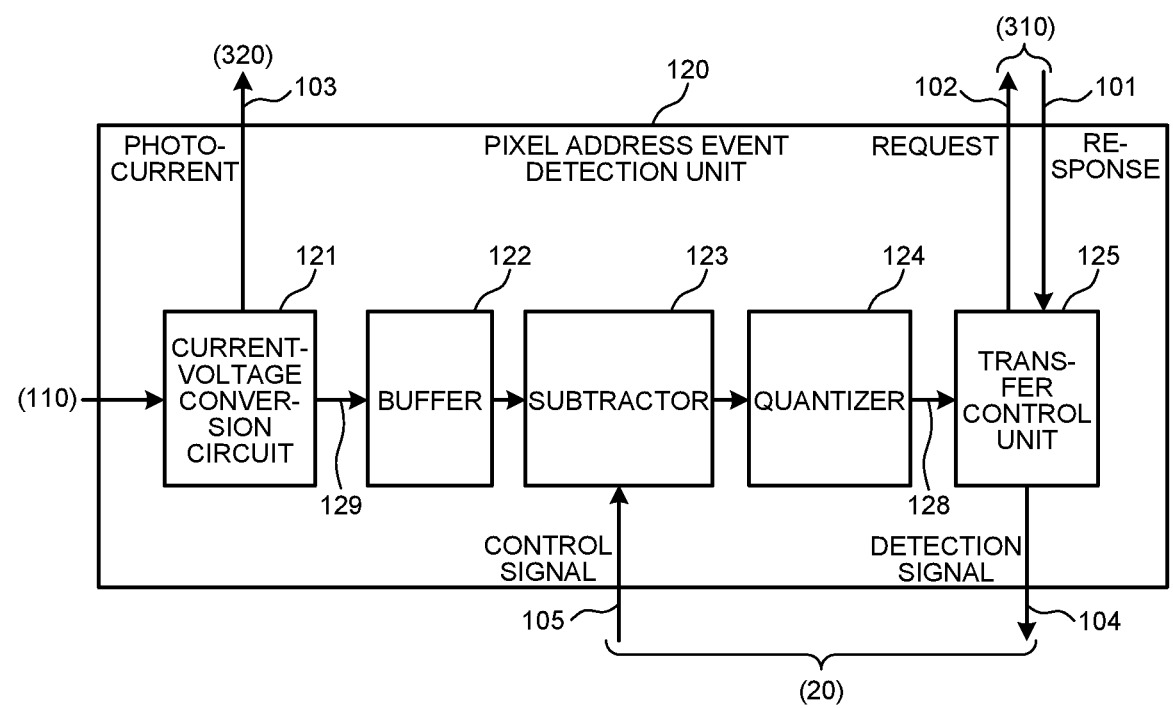
FIG. 4 is a diagram illustrating a configuration example of a pixel address event detection unit according to the first embodiment of the present disclosure.

FIG. 4 is a diagram illustrating a configuration example of the pixel address event detection unit according to the first embodiment of the present disclosure. FIG. 4 illustrates the configuration example of the pixel address event detection unit 120. The pixel address event detection unit 120 in FIG. 4 includes a current-voltage conversion circuit 121, a buffer 122, a subtractor 123, a quantizer 124, and a transfer control unit 125.

The current-voltage conversion circuit 121 converts the photocurrent from the photoelectric conversion unit 110 into a voltage signal. In the conversion, the current-voltage conversion circuit 121 performs logarithmic compression of the voltage signal. The voltage signal after conversion is output to the buffer 122. Details of a configuration of the current-voltage conversion circuit 121 will be described later.

The buffer 122 corrects the voltage signal output from the current-voltage conversion circuit 121 and outputs the corrected signal to the subtractor 123. In the pixel 100 according to the embodiment, it is possible to improve a driving force for driving a subsequent stage by the buffer 122 and to secure isolation of noise accompanying the switching operation in the subsequent stage.

The subtractor 123 obtains a change amount of the corrected signal output from the buffer 122 by a subtraction process. Then, the subtractor 123 outputs the change amount obtained to the quantizer 124 as a differential signal. Details of the configuration of the subtractor 123 will be described later.

The quantizer 124 converts (i.e., quantization) an analog differential signal into a digital detection signal by comparing the differential signal output with a predetermined threshold. The quantizer 124 according to the embodiment compares the differential signal with each of the upper limit threshold and the lower limit threshold, and outputs a comparison result to the transfer control unit 125 as a two-bit detection signal.

The transfer control unit 125 controls transfer of the detection signal to the signal processing unit 40 and the control circuit 20. When the detection signal is output from the quantizer 124, the transfer control unit 125 outputs the request to the pixel selection unit 310. Thereafter, when the response is output from the pixel selection unit 310, the transfer control unit 125 outputs the detection signal to the signal processing unit 40 and the control circuit 20.

[Configuration of Voltage-Current Conversion Circuit]

Figure 5:
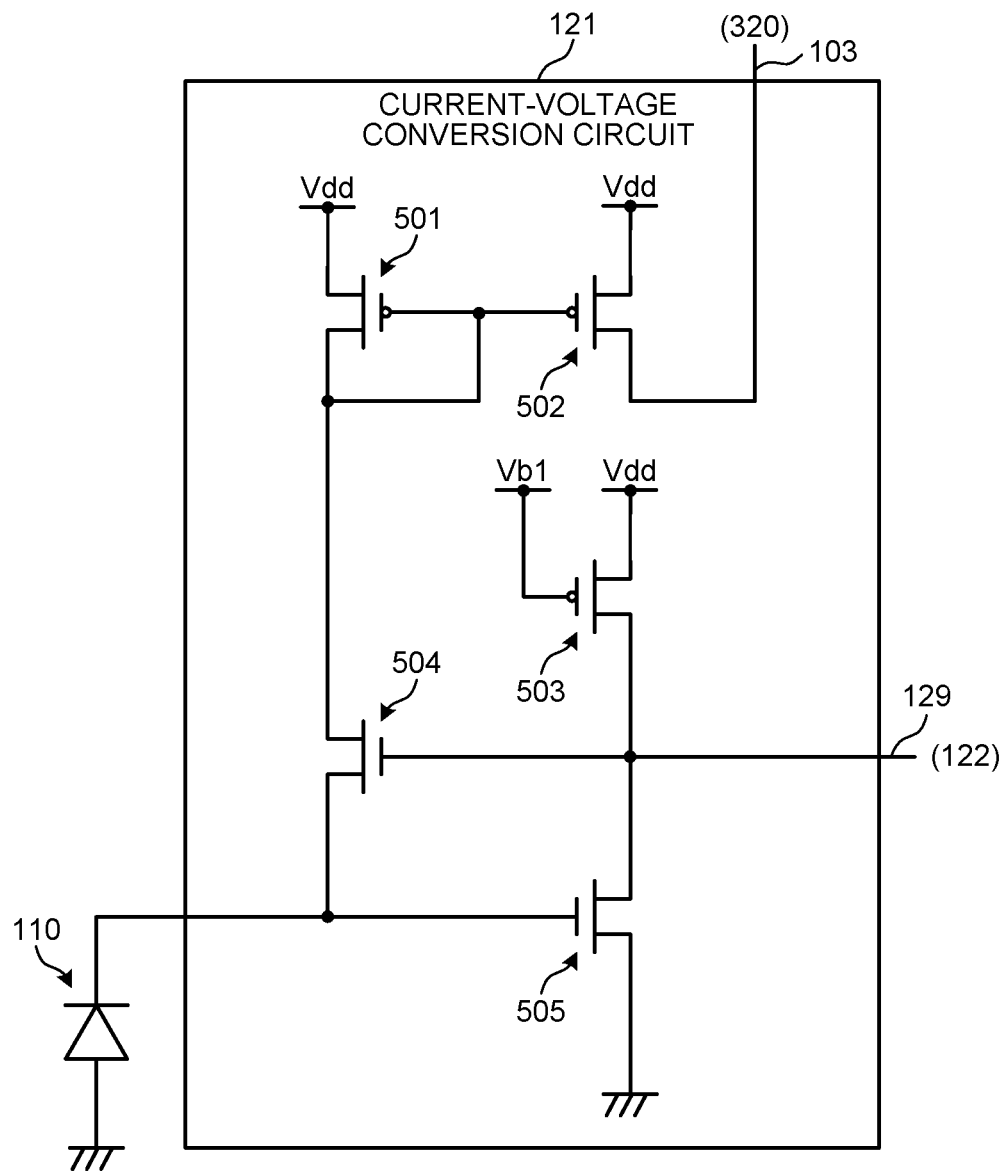
FIG. 5 is a diagram illustrating a configuration example of a current-voltage conversion circuit according to the first embodiment of the present disclosure.

FIG. 5 is a diagram illustrating a configuration example of the current-voltage conversion circuit according to the first embodiment of the present disclosure. FIG. 5 is a circuit diagram illustrating the configuration example of the current-voltage conversion circuit 121. The current-voltage conversion circuit 121 in FIG. 5 includes MOS transistors 501 to 505. Note that the photoelectric conversion unit 110 is further illustrated in FIG. 5. In FIG. 5, a power supply line Vdd supplies power. A signal line Vb1 supplies a bias voltage. For MOS transistors 501 to 503, p-channel MOS transistors can be used. For MOS transistors 504 and 505, n-channel MOS transistors can be used.

An anode of the photoelectric conversion unit 110 is grounded, and a cathode is connected to a source of the MOS transistor 504 and a gate of the MOS transistor 505. A source of the MOS transistor 505 is grounded, and a drain is connected to a gate of the MOS transistor 504, a drain of the MOS transistor 503, and a signal line 129. A gate of the MOS transistor 503 is connected to the signal line Vb1, and a source thereof is connected to the power supply line Vdd. A drain of the MOS transistor 504 is connected to a drain and a gate of the MOS transistor 501 and a gate of the MOS transistor 502. A source of the MOS transistor 501 and a source of the MOS transistor 502 are commonly connected to the power supply line Vdd. A drain of the MOS transistor 502 is connected to the signal line 103.

The MOS transistor 504 is a MOS transistor that supplies the current to the photoelectric conversion unit 110. A sink current (photocurrent) according to incident light flows through the photoelectric conversion unit 110. The MOS transistor 504 supplies the sink current. Here, the gate of the MOS transistor 504 is driven by an output voltage of the MOS transistor 505 to be described later, and outputs a source current equal to the sink current of the photoelectric conversion unit 110. Since a gate-source voltage Vgs of the MOS transistor is a voltage corresponding to the source current, the source voltage of the MOS transistor 504 is a voltage corresponding to the current of the photoelectric conversion unit 110. As a result, the current of the photoelectric conversion unit 110 is converted into the voltage signal.

The MOS transistor 505 is a MOS transistor that amplifies the source voltage of the MOS transistor 504. Furthermore, the MOS transistor 503 configures a constant current load of the MOS transistor 505. The voltage signal amplified is output to the drain of the MOS transistor 505. This voltage signal is output to the signal line 129 and fed back to the gate of the MOS transistor 504. When the gate-source voltage Vgs of the MOS transistor 504 is equal to or lower than a threshold voltage, the source current changes in an exponential manner with respect to the change in the gate-source voltage Vgs. Therefore, the output voltage of the MOS transistor 504 fed back to the gate of the MOS transistor 505 is a voltage signal obtained by logarithmically compressing the photocurrent of the photoelectric conversion unit 110 equal to the source current of the MOS transistor 504.

The MOS transistor 501 is connected between the power supply line Vdd and the drain of the MOS transistor 504, and the gate and the drain are short-circuited. Therefore, a drain current of the MOS transistor 501, i.e., the photocurrent of the photoelectric conversion unit 110, flows through the MOS transistor 504. The MOS transistor 502 forms a current mirror circuit with the MOS transistor 501, and a current substantially equal to the drain current of the MOS transistor 501 flows. As a result, the photocurrent of the photoelectric conversion unit 110 is copied and supplied to the signal line 103 connected to the drain of the MOS transistor 502.

[Configuration of Amplifier, Difference Detection Unit, and Quantizer]

Figure 6:
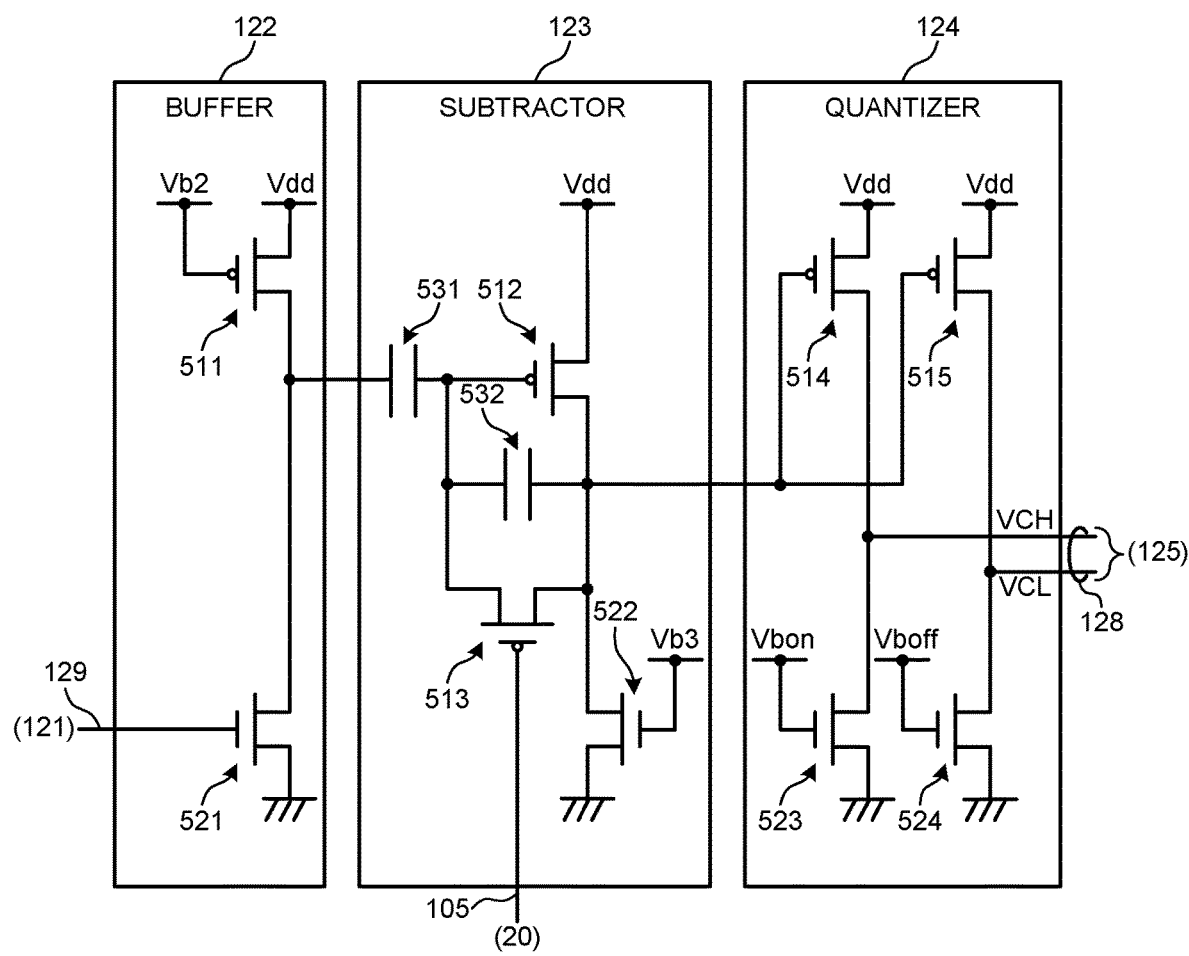
FIG. 6 is a diagram illustrating a configuration example of a buffer, a subtractor, and a quantizer according to the first embodiment of the present disclosure.

FIG. 6 is a diagram illustrating a configuration example of the buffer, the subtractor, and the quantizer according to the first embodiment of the present disclosure. FIG. 6 is a circuit diagram illustrating the configuration example of the buffer 122, the subtractor 123, and the quantizer 124. In FIG. 6, signal lines Vb2 and Vb3 supply bias voltages, respectively. Signal lines Vbon and Vboff supply voltages corresponding to the upper limit threshold of the luminance increase amount and the upper limit threshold of the luminance decrease amount described above in FIG. 1. For the MOS transistors 511 to 515, a p-channel MOS transistor can be used. For the MOS transistors 521 to 524, n-channel MOS transistors can be used.

The signal line 129 is connected to a gate of the MOS transistor 521, and the source of the MOS transistor 521 is grounded. A gate of the MOS transistor 511 is connected to a signal line Vb2, and a source of the MOS transistor 511 is grounded to the power supply line Vdd. A drain of the MOS transistor 511 is connected to a drain of the MOS transistor 521 and one end of a capacitor 531. The other end of the capacitor 531 is connected to a gate of the MOS transistor 512, a source of the MOS transistor 513, and one end of a capacitor 532. The other end of the capacitor 532 is connected to a drain of the MOS transistor 512, a drain of the MOS transistor 513, a drain of the MOS transistor 522, a gate of the MOS transistor 514, and a gate of the MOS transistor 515.

A source of the MOS transistor 512 is connected to the power supply line Vdd, and a gate of the MOS transistor 513 is connected to a signal line 105. A source of the MOS transistor 522 is grounded, and a gate is connected to a signal line Vb3. A source of the MOS transistor 514 and a source of the MOS transistor 515 are commonly connected to the power supply line Vdd. A drain of the MOS transistor 514 is connected to a drain of the MOS transistor 523 and a signal line 128 (VCH). A source of the MOS transistor 523 is grounded, and a gate is connected to the signal line Vbon. A drain of the MOS transistor 515 is connected to a drain of the MOS transistor 526 and a signal line 128 (VCL), a source of the MOS transistor 524 is grounded, and a gate is connected to the signal line Vboff.

The buffer 122 includes the MOS transistors 511 and 521. The voltage signal input via the signal line 129 is amplified by the MOS transistor 521 and output to the subtractor 123. The MOS transistor 511 configures a drain load of the MOS transistor 521.

The subtractor 123 includes the MOS transistors 512, 513, and 522 and capacitors 531 and 532. The MOS transistor 512 configures an inverting amplifier. Note that the MOS transistor 522 configures a constant current load. The capacitor 532 and the MOS transistor 513 connected in parallel configure a feedback circuit of the inverting amplifier including the MOS transistor 512. In addition, the capacitor 531 corresponds to a coupling capacitor connected to an input of the inverting amplifier. The input of this inverting amplifier is a virtual ground point. A potential of this virtual ground terminal is set to zero for convenience. The voltage signal output from the buffer 122 and applied to the capacitor 531 is denoted by Vinit. In addition, in the initial state, the MOS transistor 513 is in a conductive state, and both ends of the capacitor 532 are short-circuited.

Here, a charge $Q_{init}$ accumulated in the capacitor 531 is expressed by the following Expression (1) when the capacitor 531 has capacitance C1. On the other hand, since both ends of the capacitor 532 are short-circuited, the accumulated charge becomes 0.

$$Q_{init}=C1\times V_{init} \quad (1)$$

Next, considering a case where the MOS transistor 513 is turned off and the voltage on the buffer 322 side of the capacitor 531 changes to $V_{after}$, a charge $Q_{after}$ accumulated in the capacitor 531 is expressed by the following Expression (2).

$$Q_{after}=C1\times V_{after} \quad (2)$$

On the other hand, a charge Q2 accumulated in the capacitor 532 is expressed by the following Expression (3) when the capacitor 532 has capacitance C2 and the output voltage is denoted by $V_{out}$.

$$Q2=-C2\times V_{out} \quad (3)$$

Here, since a total charge amount of the capacitor 531 and the capacitor 532 does not change, the following Expression (4) is established.

$$Q_{init}=Q_{after}+Q2 \quad (4)$$

Then, when Expressions (1) to (3) are substituted into the above Expression (4) and transformed, the following Expression (5) is obtained.

$$V_{out}=-(C1/C2)\times(V_{after}-V_{init}) \quad (5)$$

The above Expression (5) represents the subtraction operation of the voltage signal, and a gain of a subtraction result is C1/C2. Normally, it is desired to maximize the gain, and thus it is preferable to design the capacitance C1 to be large and the capacitance C2 to be small. On the other hand, when the capacitance C2 is too small, kTC noise increases, and noise characteristics may deteriorate. Therefore, reduction of the capacitance C2 is limited to a range in which noise can be tolerated.

In this manner, a change in the input signal is subtracted and output. The change in the input signal is integrated in the capacitor 532. When the reset signal is input to the gate of the MOS transistor 513 via the signal line 105, the MOS transistor 513 becomes conductive, the charge of the capacitor 532 is discharged, and the change in the integrated input signal is reset.

The MOS transistors 514, 515, 523, and 524 configure a quantizer 124. The MOS transistors 514 and 523 configure a comparator, and compare the output signal of the subtractor 123 with a bias voltage Vbon indicating the upper limit threshold. As a result of the comparison, when the output signal of the subtractor 123 exceeds Vbon, the on-event detection signal VCH is output to the transfer control unit 125 as the detection signal. Furthermore, the MOS transistors 515 and 524 configure a comparator, and compare the output signal of the subtractor 123 with a bias voltage Vboff indicating the lower limit threshold. As a result of the comparison, when the output signal of the subtractor 123 is less than Vboff, the off-event detection signal VCL is output to the transfer control unit 125 as the detection signal.

[Configuration of Region Address Event Detection Unit]

Figure 7:
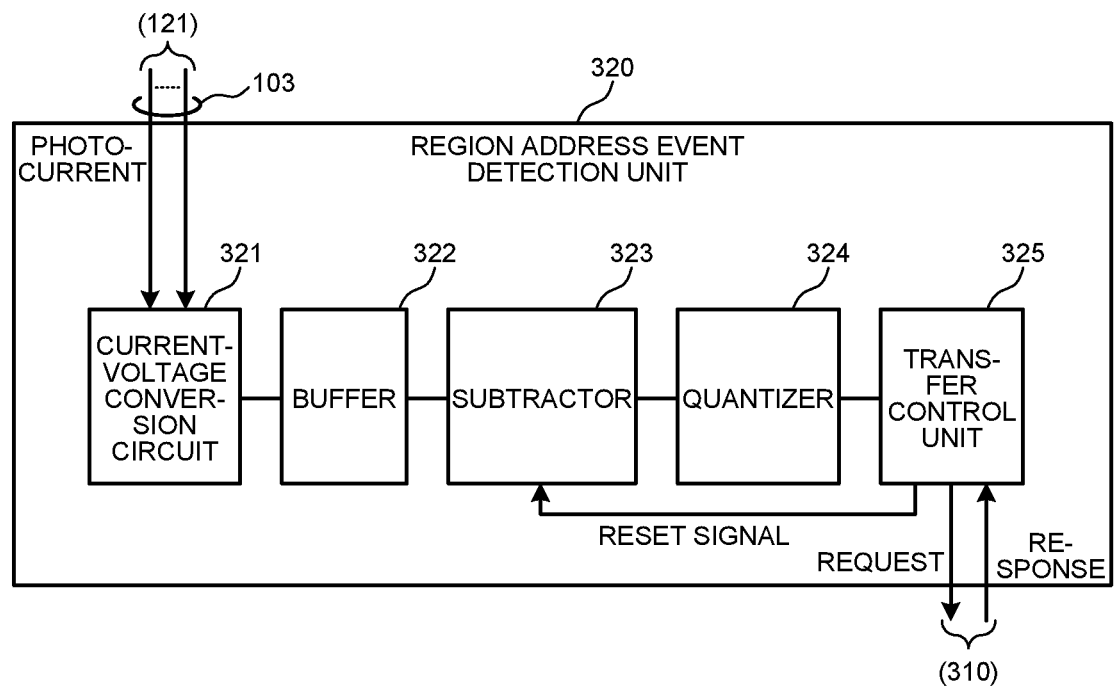
FIG. 7 is a diagram illustrating a configuration example of a region address event detection unit according to the first embodiment of the present disclosure.

FIG. 7 is a diagram illustrating a configuration example of the region address event detection unit according to the first embodiment of the present disclosure. FIG. 7 illustrates the configuration example of the region address event detection unit 320. The region address event detection unit 320 in FIG. 7 includes a current-voltage conversion circuit 321, a buffer 322, a subtractor 323, a quantizer 324, and a transfer control unit 325.

The photocurrent of the pixels 100 included in the region 591 is input to the current-voltage conversion circuit 321, and the total photocurrent is converted into the voltage signal and logarithmically compressed.

The transfer control unit 325 exchanges the request and the response with the pixel selection unit 310. In addition, the transfer control unit 325 outputs a reset signal to the subtractor 323 when the response is input. Other configuration of the transfer control unit 325 can be similar to those of the transfer control unit 125 described in FIG. 4.

The buffer 322, the subtractor 323, and the quantizer 324 can have configurations similar to those of the buffer 122, the subtractor 123, and the quantizer 124 described in FIG. 4, respectively.

[Configuration of Voltage-Current Conversion Circuit]

Figure 8:
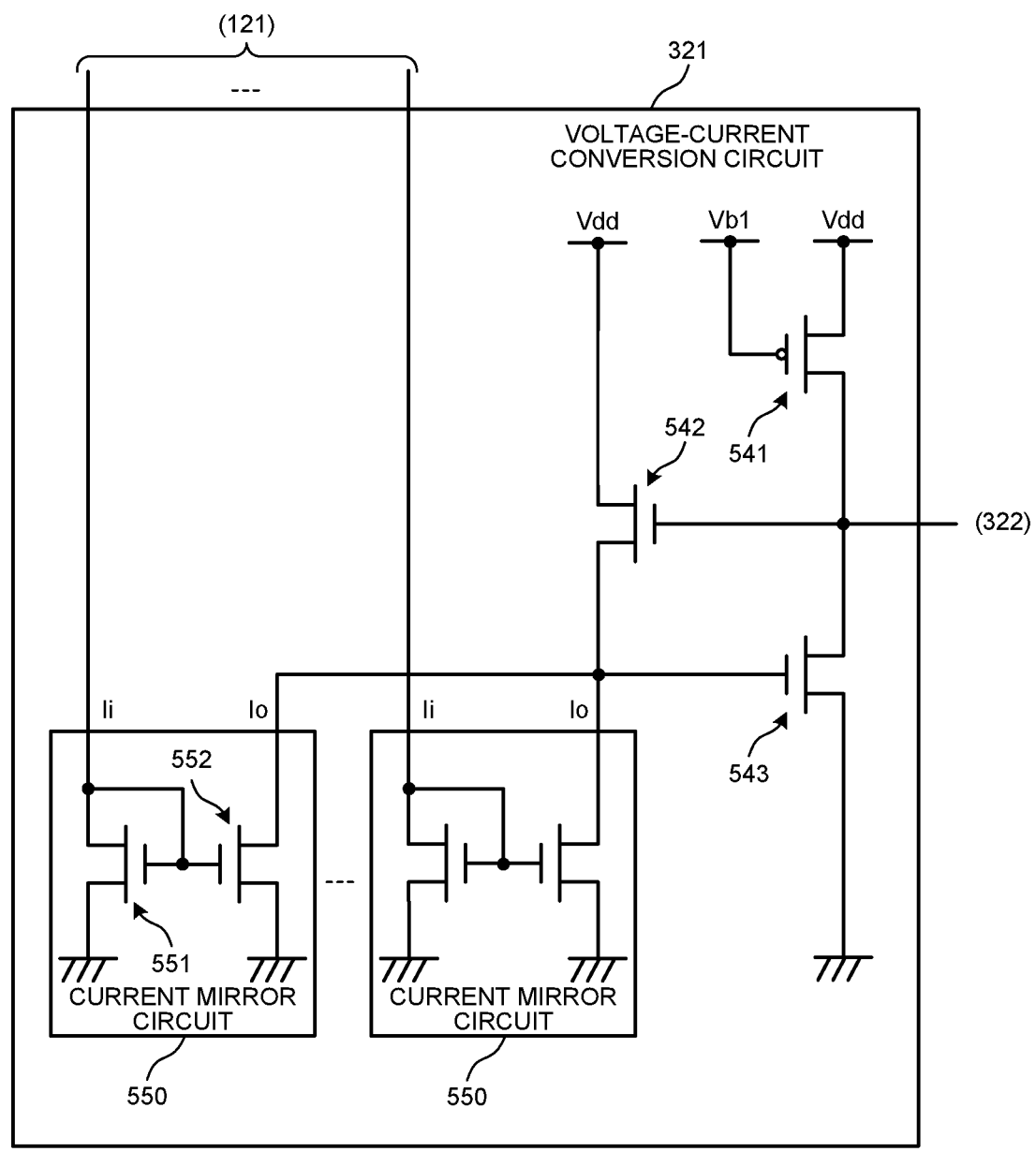
FIG. 8 is a diagram illustrating a configuration example of the current-voltage conversion circuit according to the first embodiment of the present disclosure.

FIG. 8 is a diagram illustrating a configuration example of the current-voltage conversion circuit according to the first embodiment of the present disclosure. FIG. 8 is a circuit diagram illustrating the configuration example of the current-voltage conversion circuit 321. The current-voltage conversion circuit 321 includes MOS transistors 541 to 543 and a plurality of current mirror circuits 550.

The circuit including the MOS transistors 541 to 543 converts the photocurrent into the voltage signal similarly to the current-voltage conversion circuit including the MOS transistors 503 to 505 described in FIG. 5.

The current mirror circuit 550 includes MOS transistors 551 and 552. For the MOS transistors 551 and 552, n-channel MOS transistors can be used. The current mirror circuit 550 includes an input terminal Ii and an output terminal Io. The input terminal Ii is connected to a drain of the MOS transistor 551, a gate of the MOS transistor 551, and a gate of the MOS transistor 552. A source of the MOS transistor 551 and a source of the MOS transistor 552 are grounded. A drain of the MOS transistor 552 is connected to the output terminal Io.

In the current mirror circuit 550 in FIG. 8, a current substantially equal to a current flowing through the input terminal Ii flows into the output terminal Io. Since the photocurrent of the pixel 100 included in the region 591 flows through the input terminal Ii, a current having the same value also flows through the output terminal Io. The current mirror circuits 550 as many as the pixels 100 included in the region 591 are arranged, and the photocurrent is input to each of the current mirror circuits 550. Since the output terminal Io of the current mirror circuit 550 is connected to the source of the MOS transistor 542, a current corresponding to the total photocurrent of the pixels 100 included in the region 591 flows through the MOS transistor 542. As a result, the current-voltage conversion circuit 321 converts the total photocurrent of the pixels 100 included in the region 591 into the voltage signal.

The voltage signal output from the current-voltage conversion circuit 321 is processed by the buffer 322, the subtractor 323, and the quantizer 324 to detect the region address event.

[Configuration of Pixel Selection Unit]

Figure 9:
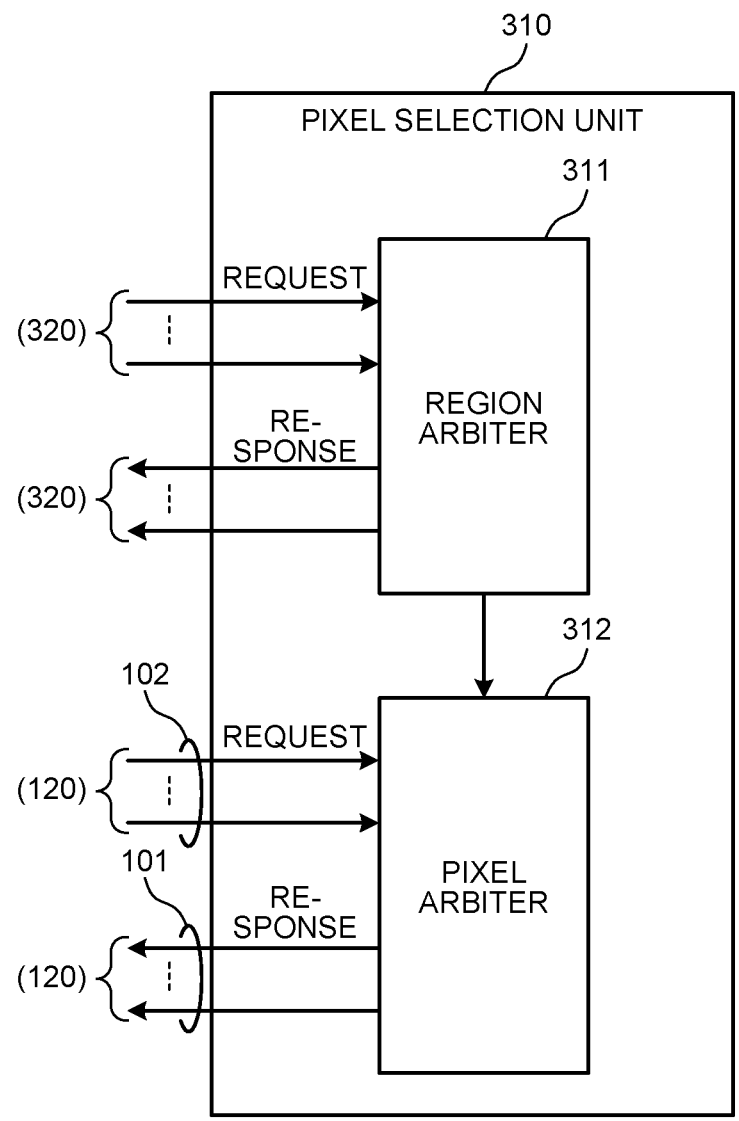
FIG. 9 is a block diagram illustrating a configuration example of a pixel selection unit according to the first embodiment of the present disclosure.

FIG. 9 is a block diagram illustrating a configuration example of the pixel selection unit according to the first embodiment of the present disclosure. FIG. 9 illustrates the configuration example of the pixel selection unit 310. The pixel selection unit 310 in FIG. 9 includes a region arbiter 311 and a pixel arbiter 312.

The region arbiter 311 arbitrates the request from the region address event detection unit 320. The region arbiter 311 arbitrates requests from the plurality of region address event detection units 320 and outputs the response as an arbitration result. This arbitration can be performed, for example, by selecting the region address event detection unit 320 in the order of arrival of request. Furthermore, the region arbiter 311 outputs the region 591 corresponding to the selected region address event detection unit 320 to the pixel arbiter 312.

The pixel arbiter 312 arbitrates the request from the pixel address event detection unit 120. The pixel arbiter 312 arbitrates requests from the plurality of pixel address event detection units 120 and outputs the response as an arbitration result. This arbitration can be performed, for example, by preferentially selecting the request from the pixel address event detection unit 120 included in the region 591 selected by the region arbiter 311. Specifically, when the region arbiter 311 selects the region 591, the pixel address event detection unit 120 can be selected in the order of arrival of requests from the pixels 100 included in the region to output the response. Furthermore, in a case where the region arbiter 311 does not select the region 591, the pixel address event detection unit 120 can be selected in the order of arrival of requests from all the pixels 100 of the pixel array unit 10 to output the response. In this manner, the pixel selection unit 310 can select the pixel 100 based on the pixel address event and the region address event.

[Image Data Generation Process]

Figure 10:
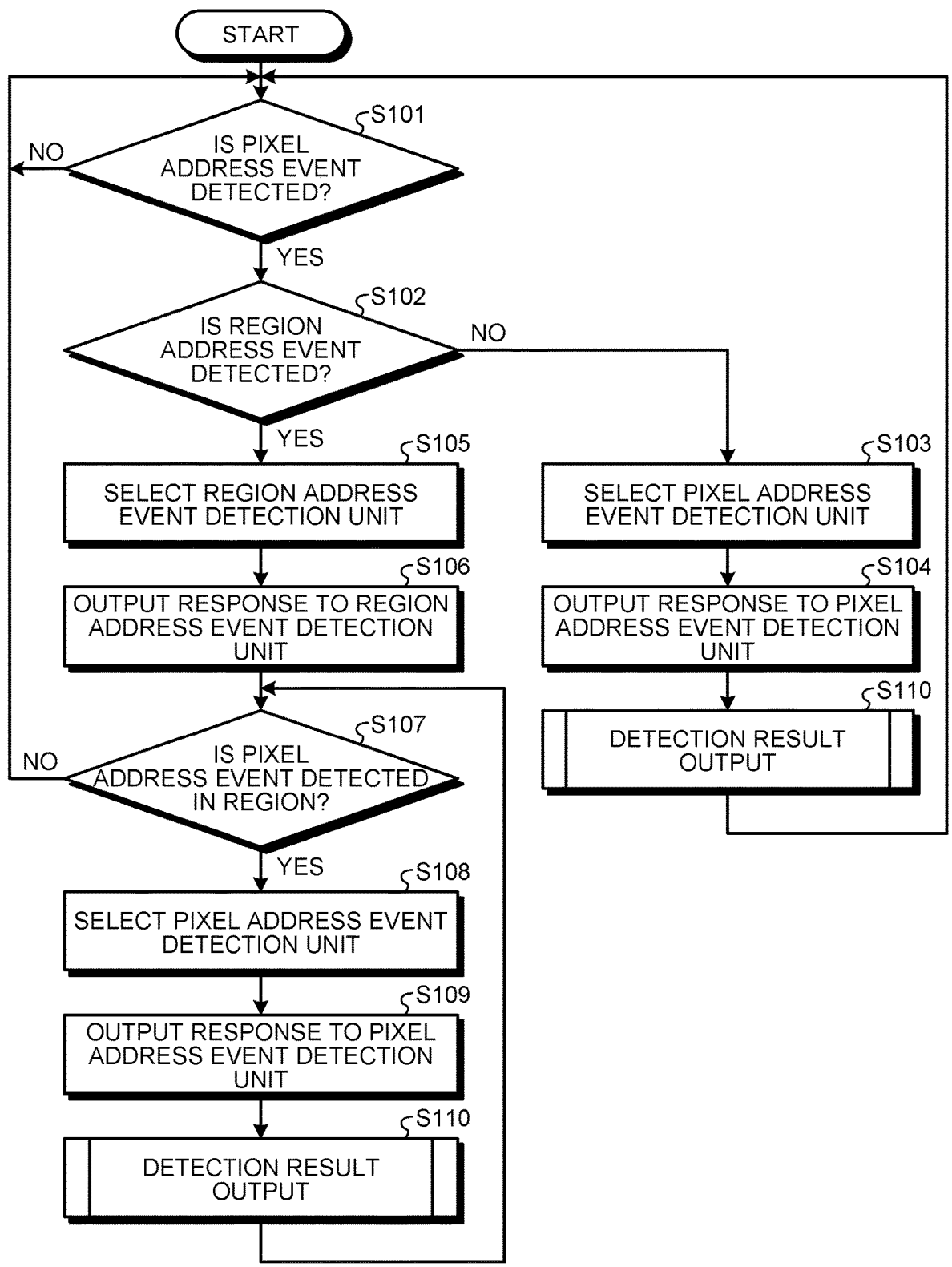
FIG. 10 is a diagram illustrating an example of an image data generation process according to the first embodiment of the present disclosure.

FIG. 10 is a diagram illustrating an example of an image data generation process according to the first embodiment of the present disclosure. FIG. 10 illustrates the example of the image data generation process in the image pickup element 2. First, the pixel address event detection unit 120 detects the pixel address event in all the pixels 100 arranged in the pixel array unit 10, and the pixel selection unit 310 determines whether or not the pixel address event is detected (Step S101). It can be determined that the pixel address event is detected when the pixel address event is detected and the request is output from any of the pixel address event detection units 120 of the pixels 100 arranged in the pixel array unit 10. The pixel selection unit 310 waits until this pixel address event is detected and the request is output (Step S101, No). Note that the process in Step S101 is an example of a pixel address event detection step described in the claims.

When the pixel address event is detected (Step S101, Yes), the pixel selection unit 310 determines whether the region address event is detected (Step S102). When the region address event is detected and the request is output from any one of the plurality of region address event detection units 320, it can be determined that the region address event is detected. Note that the process in Step S102 is an example of a region address event detection step described in the claims.

When no region address event is detected (Step S102, No), the pixel selection unit 310 detects the pixel address event and selects the pixel address event detection unit 120 that has output the request (Step S103). When there is a plurality of pixel address event detection units 120 that has output the request, the pixel selection unit 310 can select the pixel address event detection unit 120 in the order of arrival of requests.

Next, the pixel selection unit 310 outputs the response to the pixel address event detection unit 120 of the selected pixel 100 (Step S104). The pixel address event detection unit 120 to which this response is output executes a detection result output process (Step S110). Thereafter, the process proceeds to Step S101.

In Step S102, when the region address event is detected (Step S102, Yes), the pixel selection unit 310 selects the region address event detection unit 320 that has output the region address event (Step S105). When there is a plurality of region address event detection units 320 that has output the request, the pixel selection unit 310 can select the region address event detection unit 320 in the order of arrival of requests.

Next, the pixel selection unit 310 outputs the response to the selected region address event detection unit 320 (Step S106).

Next, the pixel selection unit 310 determines whether or not the pixel address event has been detected in the pixels 100 in the selected region (Step S107). When the pixel address event has been detected, i.e., when the request has been output from the pixel address event detection unit 120 of the pixel 100 in the selected region (Step S107, Yes), the pixel selection unit 310 selects the pixel address event detection unit 120 that has output the request (Step S108). When there is a plurality of pixel address event detection units 120 that has output the request, the pixel selection unit 310 can select the pixel address event detection unit 120 in the order of arrival of requests.

Next, the pixel selection unit 310 outputs the response to the selected pixel address event detection unit 120 (Step S109). The pixel address event detection unit 120 to which this response is output executes a detection result output process (Step S110). Thereafter, the process from Step S107 is repeated again.

When the pixel address event is not detected in Step S107 (Step S107, No), it can be determined that the detection result has been output from all the pixels 100 in which the pixel address event in the selected region has been detected. In this case, the process proceeds to Step S101 again. Note that the processes in Steps S103 and S108 are examples of a selection step described in the claims.

[Detection Result Output Process]

Figure 11:
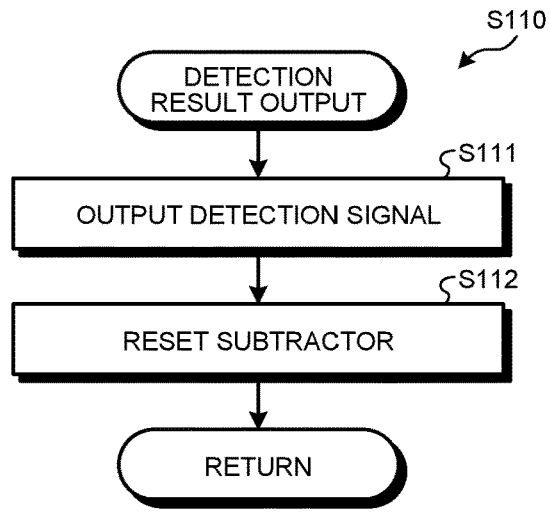
FIG. 11 is a diagram illustrating an example of a detection result output process according to the first embodiment of the present disclosure.

FIG. 11 is a diagram illustrating an example of the detection result output process according to the first embodiment of the present disclosure. FIG. 11 illustrates the example of the detection result output process (Step S110) in FIG. 10. Note that the process in FIG. 11 represents the example of the process in the pixel address event detection unit 120. First, the transfer control unit 125 of the pixel address event detection unit 120, to which the response has been output by the pixel selection unit 310, outputs the detection signal to the signal processing unit 40 and the control circuit 20 (Step S111). As a result, the signal processing unit 40 generates the image data. In addition, the control circuit 20 generates and outputs the control signal to the subtractor 123. The subtractor 123 is reset by this control signal (Step S112). Then, the detection result output process ends. Note that the process in Step S111 is an example of a detection result output step described in the claims.

With the above processes, the image data can be generated based on the detected pixel address event and the region address event.

Modification (1) of First Embodiment

Figure 12:
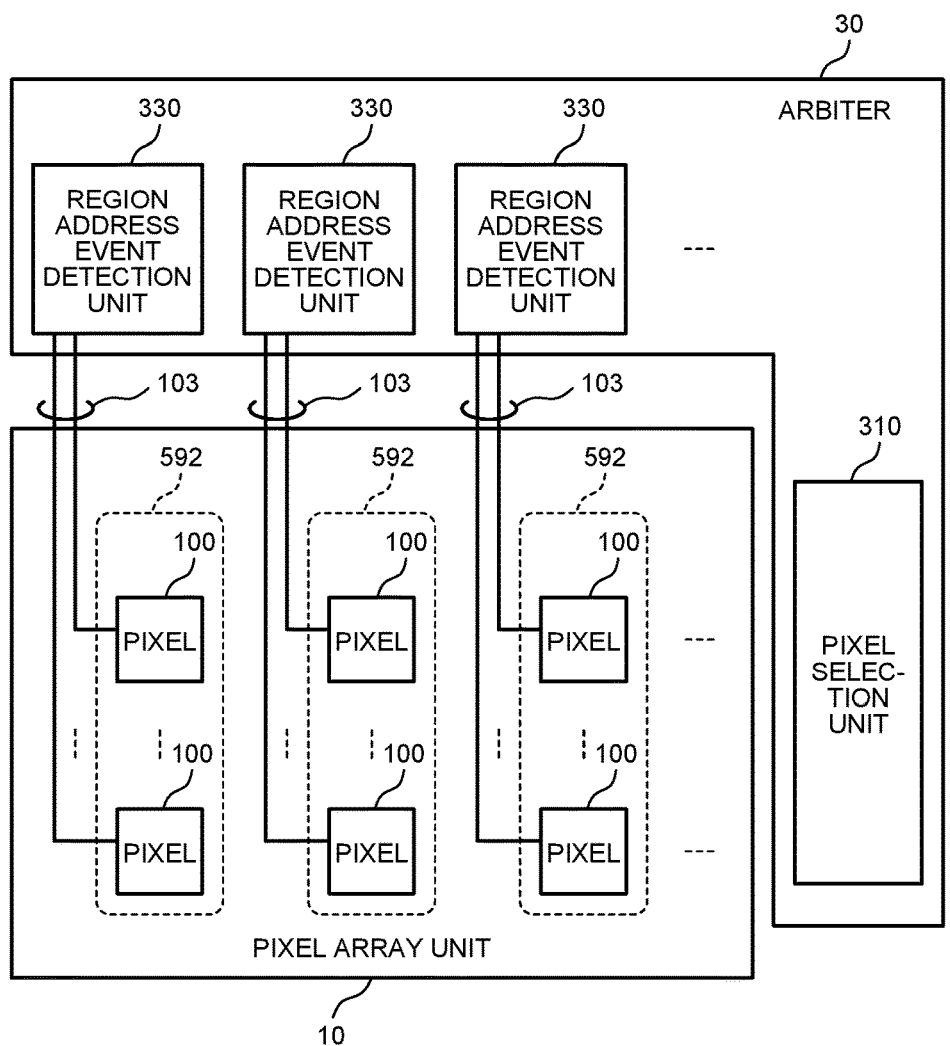
FIG. 12 is a diagram illustrating a configuration example of a pixel array unit and an arbiter according to a first modification of the first embodiment of the present disclosure.

FIG. 12 is a diagram illustrating a configuration example of the pixel array unit and the arbiter according to a first modification of the first embodiment of the present disclosure. FIG. 12 illustrates the configuration of the pixel array unit 10 and the arbiter 30 similarly to FIG. 3. The pixel array unit is different from the pixel array unit 10 in FIG. 3 in that a region is formed for each column of the pixels 100 arranged in the pixel array unit 10. For convenience, illustration of the control circuit 20 and some signal lines is omitted to simplify the pixel 100.

A region 592 in FIG. 12 is a region arranged for each column of the pixels 100 arranged in the two-dimensional matrix. A region address event detection unit 330 in FIG. 12 is arranged for each region 592. The photocurrent from the pixels 100 included in the region 592 is input to the region address event detection unit 330. As a result, the region address event detection unit 330 can detect the region address event of the corresponding region 592.

Note that the configuration of the region 591 is not limited to this example. For example, the region 592 can be set for each of a plurality of columns such as every two columns of the pixels 100 arranged in the pixel array unit 10.

Modification (2) of First Embodiment

Figure 13:
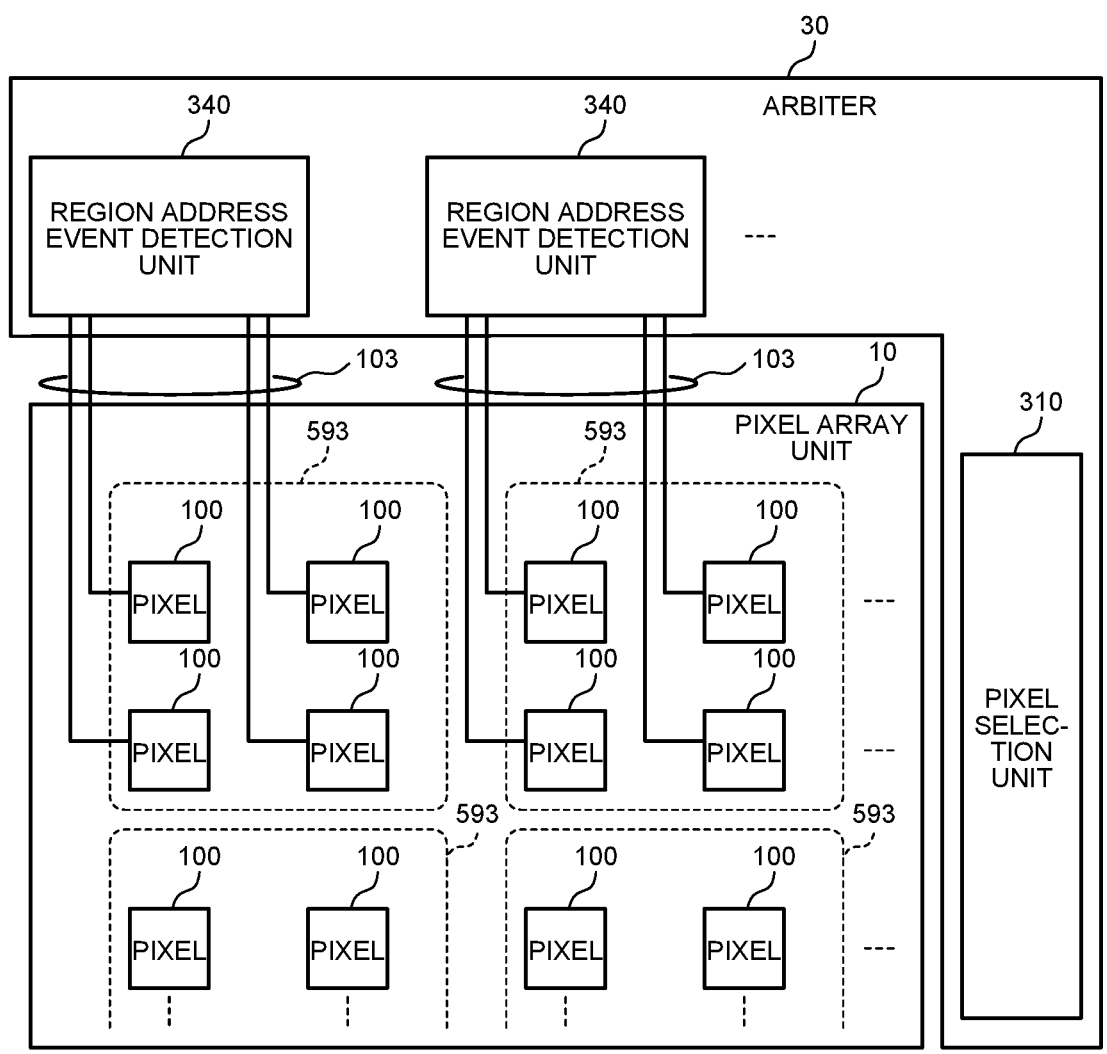
FIG. 13 is a diagram illustrating a configuration example of a pixel array unit and an arbiter according to a second modification of the first embodiment of the present disclosure.

FIG. 13 is a diagram illustrating a configuration example of the pixel array unit and the arbiter according to a second modification of the first embodiment of the present disclosure. FIG. 13 illustrates the configuration of the pixel array unit 10 and the arbiter 30 similarly to FIG. 12. The pixel array unit is different from the pixel array unit 10 in FIG. 12 in that a region is formed for each block of two rows and two columns of the pixels 100 arranged in the pixel array unit 10.

A region 593 in FIG. 13 is a region arranged for every four pixels 100 in two rows and two columns of the pixels 100 arranged in the two-dimensional matrix. A region address event detection unit 340 in FIG. 13 is arranged for each region 593. The photocurrent from the pixels 100 included in the region 593 is input to the region address event detection unit 340, and the region address event of the region 593 can be detected.

Note that the configuration of the region 591 is not limited to this example. For example, the region 593 can be set for each block of different sizes of the pixels 100 arranged in the pixel array unit 10.

As described above, the image pickup element 2 according to the first embodiment of the present disclosure selects the pixel 100 based on the pixel address event and the region address event, and outputs the detection signal based on the pixel address event of the selected pixel 100. As a result, a different process can be performed for each region. For example, regions can be prioritized based on detected region address events. A region where the region address event is detected can be set to a high priority, so that the image data of the region having a large luminance change can be preferentially generated. As a result, it is possible to suppress a delay in detection of a valid event such as movement of the observation target. In addition, it is also possible to specify the region where the region address event is detected as a region of interest (ROI).

On the other hand, an invalid event such as noise is detected as a single pixel address event of each pixel 100. By lowering the priority of the invalid events, noise and the like can be suppressed.

Second Embodiment

In the above-described first embodiment, the pixel 100 in the region in which the region address event is detected is preferentially selected to detect the pixel address event. On the other hand, a second embodiment of the present disclosure is different from the above-described first embodiment in that the pixel 100 in a region different from the region in which the region address event is detected are preferentially selected.

The pixel selection unit 310 in the second embodiment of the present disclosure sets priority of the region 591 in which the region address event is detected to low priority. For example, the pixel selection unit 310 can omit detection of the pixel address event of the pixel 100 included in the region 591 in which the region address event is detected. As a result, it is possible to stop the generation of the image data of the region where the luminance change is large.

[Configuration of Pixel Array Unit and Arbiter]

Figure 14:
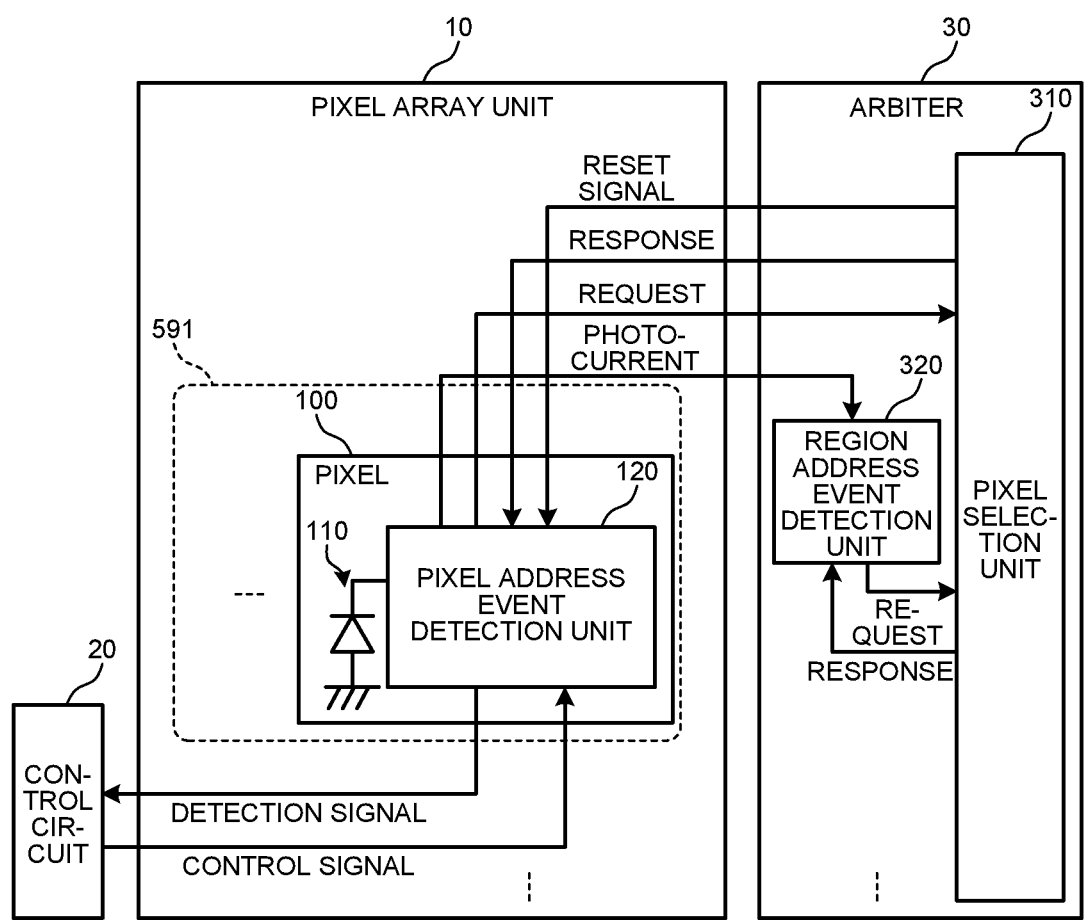
FIG. 14 is a diagram illustrating a configuration example of a pixel array unit and an arbiter according to a second embodiment of the present disclosure.

FIG. 14 is a diagram illustrating a configuration example of a pixel array unit and an arbiter according to the second embodiment of the present disclosure. FIG. 12 illustrates the configuration of the pixel array unit 10 and the arbiter 30 similarly to FIG. 3. The pixel array unit is different from the pixel array unit 10 in FIG. 3 in that the pixel selection unit 310 outputs a reset signal to the pixel address event detection unit 120. For convenience, one pixel 100 is illustrated as an example in the pixel array unit 10 in FIG. 14

The pixel selection unit 310 in FIG. 14 outputs the reset signal to the pixel address event detection unit 120 arranged in the region 591 in which the region address event is detected.

When the reset signal is input, the pixel address event detection unit 120 in FIG. 14 stops outputting the request. For example, the pixel address event detection unit 120 in FIG. 14 can reset its own subtractor 123 when the reset signal is input.

[Image Data Generation Process]

Figure 15:
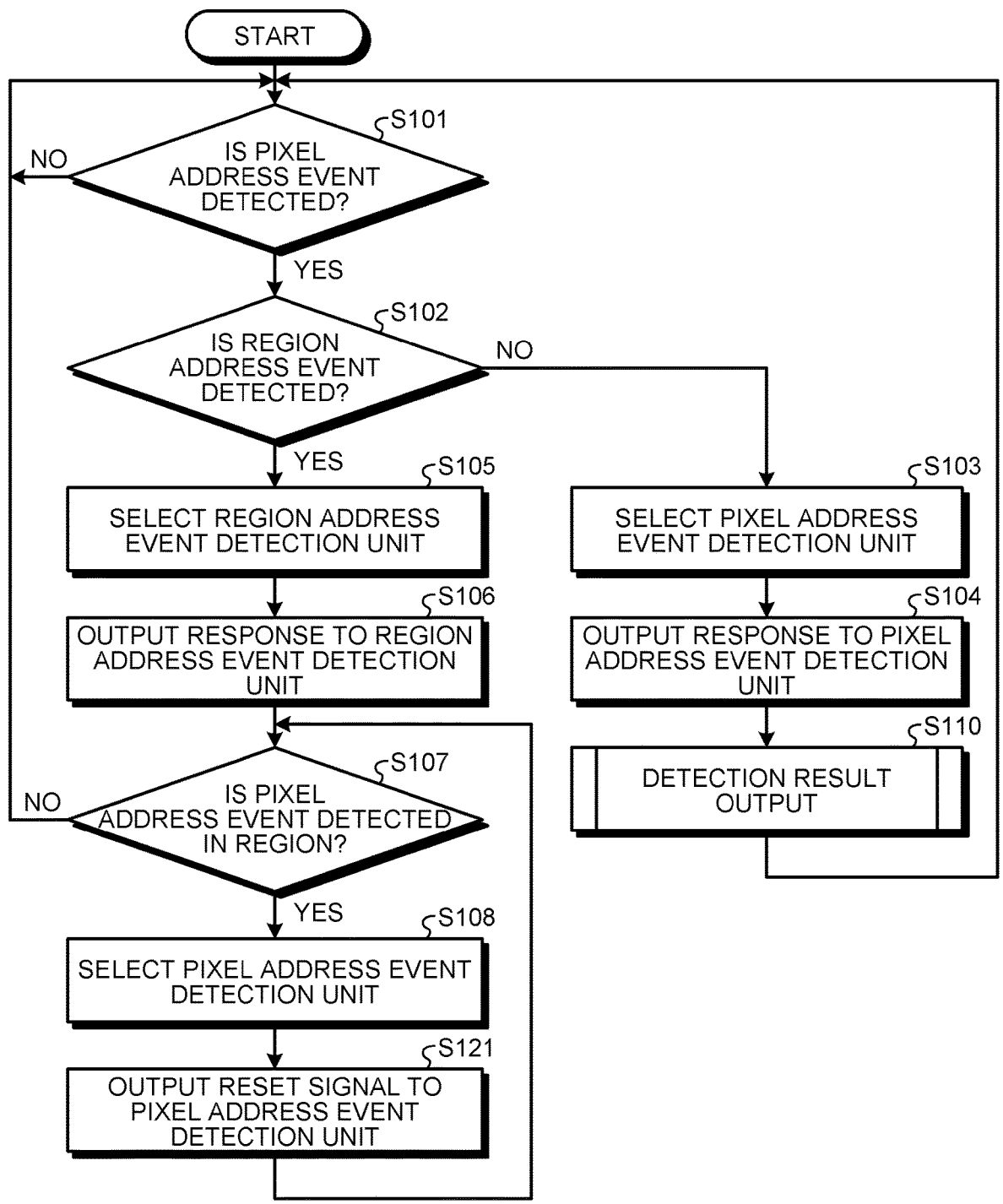
FIG. 15 is a diagram illustrating an example of an image data generation process according to the second embodiment of the present disclosure.

FIG. 15 is a diagram illustrating an example of the image data generation process according to the second embodiment of the present disclosure. Similarly to FIG. 10, FIG. 15 illustrates the example of the image data generation process in the image pickup element 2. The process is different from the image data generation process in FIG. 10 in that a process of outputting the reset signal to the pixel address event detection unit 120 (Step S121) is performed after the process in Step S108.

In FIG. 15, the pixel selection unit 310 can stop the output of the detection signal from the pixel address event detection unit 120 in the region 591 by outputting the reset signal to all the pixels 100 in the region 591 in which the region address event has been detected. On the other hand, in FIG. 15, the pixel selection unit 310 can output a response when the pixel address event is detected in the pixel 100 included in the region 591 different from the region 591 in which the region address event has been detected. As a result, when a part of the region 591 of the image pickup element is irradiated with strong light due to flicker or the like, generation of image data of the region can be stopped.

Since the configuration of the image pickup element 2 other than this point is similar to that of the first embodiment of the present disclosure, the description thereof will be omitted.

As described above, the image pickup element 2 according to the second embodiment of the present disclosure resets the pixel address event detection unit 120 included in the region in which the region address event is detected, and detects the pixel address event in a region different from the region in which the region address event is detected. As a result, it is possible to suppress the generation of the image data based on the pixel 100 in which the pixel address event is detected due to flicker or the like.

Third Embodiment

In the above-described first embodiment, the pixel 100 in the region in which the region address event is detected is preferentially selected to detect the pixel address event. On the other hand, a third embodiment of the present disclosure is different from the above-described first embodiment in that a standby state is set until an address event in a specific region is detected.
[Configuration of Arbiter]

Figure 16:
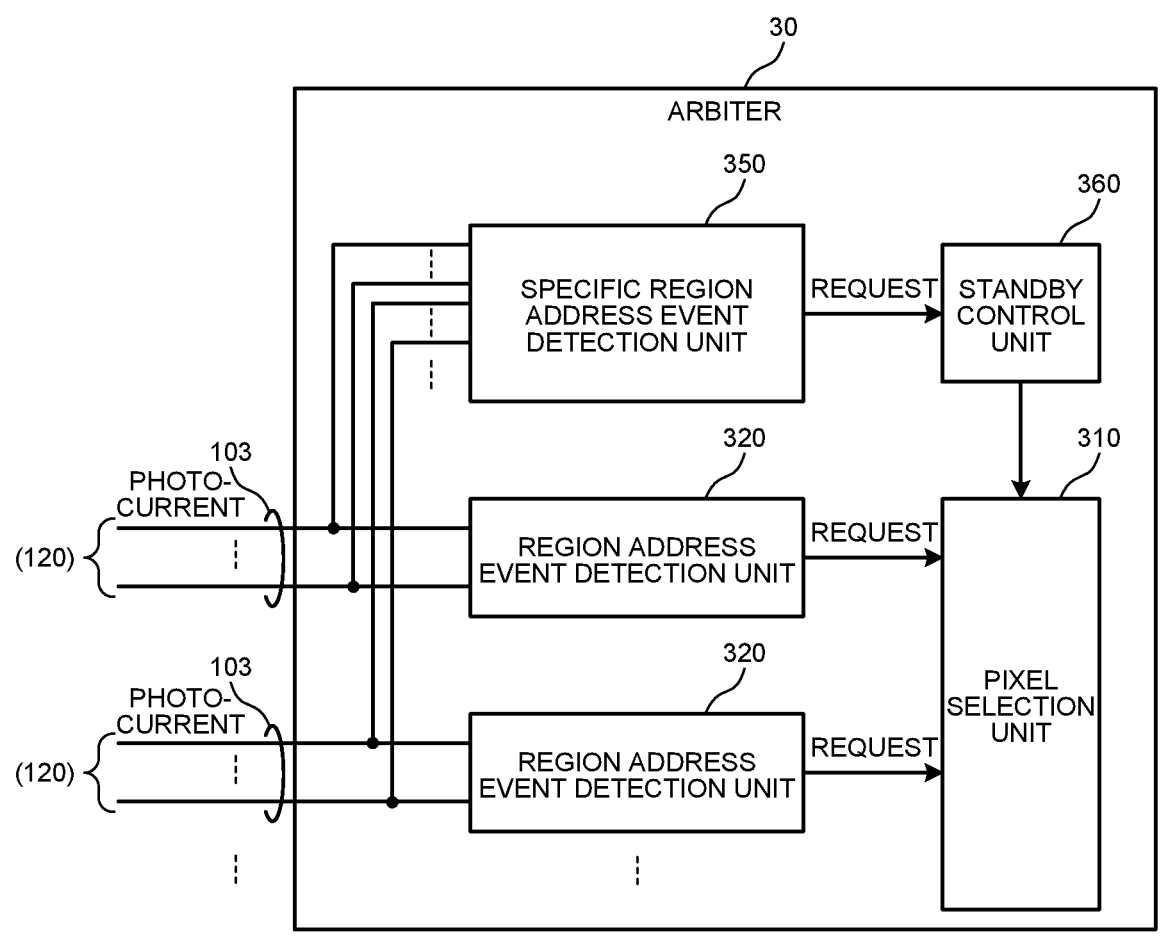
FIG. 16 is a diagram illustrating a configuration example of an arbiter according to a third embodiment of the present disclosure.

FIG. 16 is a diagram illustrating a configuration example of an arbiter according to the third embodiment of the present disclosure. FIG. 16 illustrates the configuration example of the arbiter 30. The arbiter 30 in FIG. 16 is different from the arbiter 30 in FIG. 3 in that a specific region address event detection unit 350 and a standby control unit 360 are further included.

The specific region address event detection unit 350 detects the address event based on a change amount of charge generated by photoelectric conversion in the photoelectric conversion unit 110 included in a specific region among all the pixels 100 arranged in the pixel array unit 10. The specific region address event detection unit 350 in FIG. 16 illustrates an example of detecting the address event using the pixel array unit 10 as the specific region. The photocurrent of all the pixels 100 included in the pixel array unit 10 are input to the specific region address event detection unit 350 in FIG. 16, and the address event is detected when a change amount of a total photocurrent exceeds a predetermined threshold. The specific region address event detection unit 350 that has detected the address event can output a request similarly to the region address event detection unit 320.

The standby control unit 360 controls the standby state in which an output of a detection result of a pixel address event is stopped. The standby control unit 360 controls the standby state based on the address event detected by the specific region address event detection unit 350. Specifically, in a case where there is no output of the request from the specific region address event detection unit 350 in a preset period, the standby control unit 360 can shift the image pickup element 2 to the standby state. The shift to the standby state can be performed, for example, by stopping the output of the response to the pixel address event detection unit 120 from the pixel selection unit 310. When the request is output from the specific region address event detection unit 350 after shifting to the standby state, the standby control unit 360 can return the image pickup element 2 from the standby state to a normal state in which the image data is generated.

Since the configuration of the image pickup element 2 other than this point is similar to that of the first embodiment of the present disclosure, the description thereof will be omitted.

As described above, the image pickup element 2 according to the third embodiment of the present disclosure can reduce power consumption in the image pickup element 2 by detecting the address event based on the change in the total photocurrent of the photoelectric conversion units included in the specific region in the pixel array unit 10 and controlling the standby state.

Fourth Embodiment

In the above-described first embodiment, the image data is generated from the detection signal of the pixel address event output from the pixel 100. On the other hand, a fourth embodiment of the present disclosure is different from the above-described first embodiment in that the image data is generated from the image signal generated based on incident light.
[Configuration of Pixel Array Unit and Arbiter]

Figure 17:
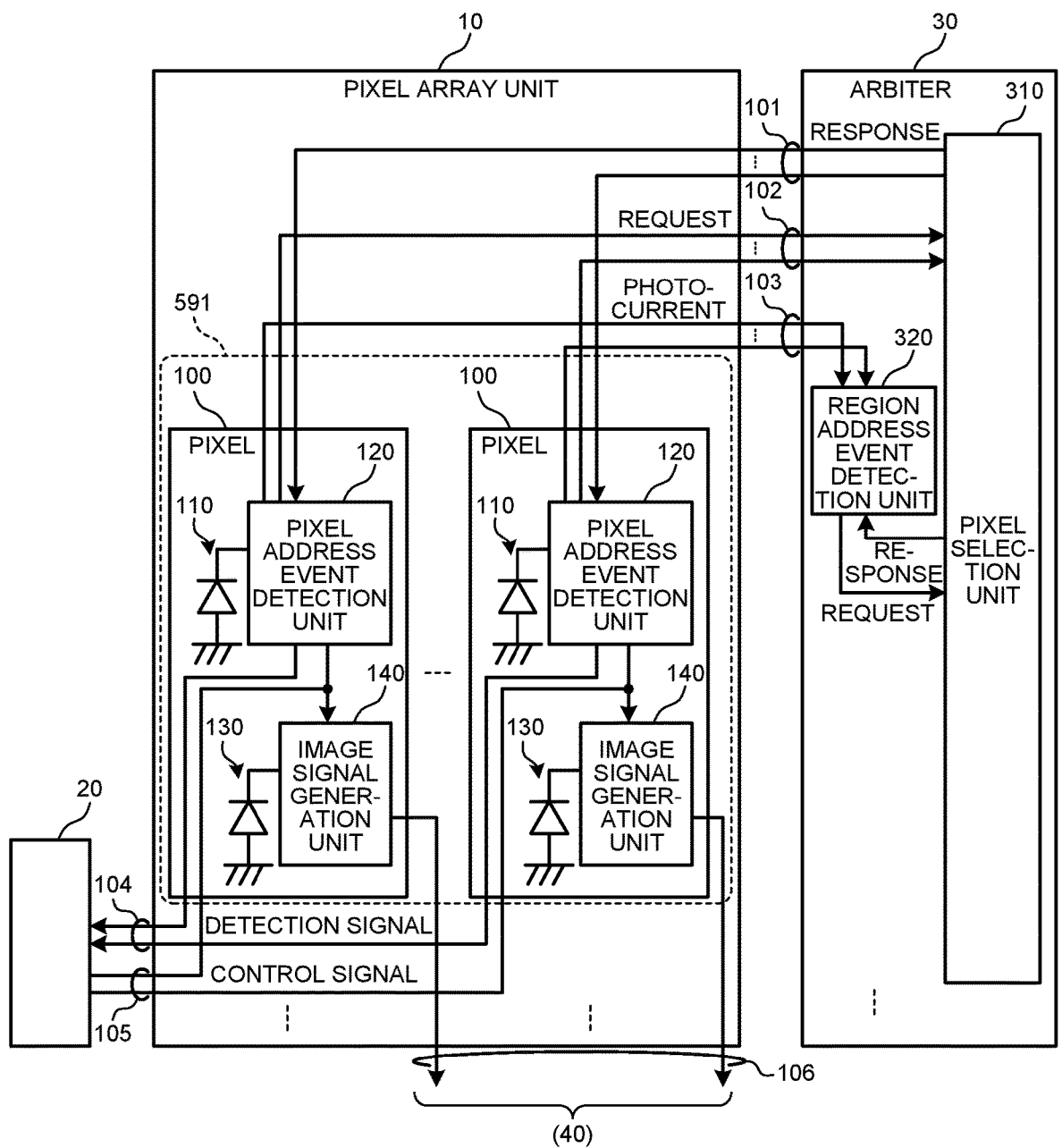
FIG. 17 is a diagram illustrating a configuration example of a pixel array unit and an arbiter according to a fourth embodiment of the present disclosure.

FIG. 17 is a diagram illustrating a configuration example of a pixel array unit and an arbiter according to the fourth embodiment of the present disclosure. FIG. 12 illustrates the configuration of the pixel array unit 10 and the arbiter 30 similarly to FIG. 3. The pixel array unit is different from the pixel array unit 10 in FIG. 3 in that a photoelectric conversion unit 130 and an image signal generation unit 140 are further arranged in the pixel 100.

The photoelectric conversion unit 130 can include a photodiode similarly to the photoelectric conversion unit 110.

The image signal generation unit 140 generates the image signal based on a charge generated by a photoelectric conversion in the photoelectric conversion unit 130. The image signal generation unit 140 is controlled by a control signal output from the control circuit 20, generates the image signal, and outputs the image signal to the signal processing unit 40.

When the response is output from the pixel selection unit 310, the pixel address event detection unit 120 in FIG. 17 outputs the detection signal to the control circuit 20. The control circuit 20 outputs the control signal to the image signal generation unit 140 of the pixel 100 that has output the detection signal. As a result, the image signal is generated and output. The image pickup element 2 can generate the image signal in the pixel 100 in which the address event is detected.
[Configuration of Image Signal Generation Unit]

Figure 18:
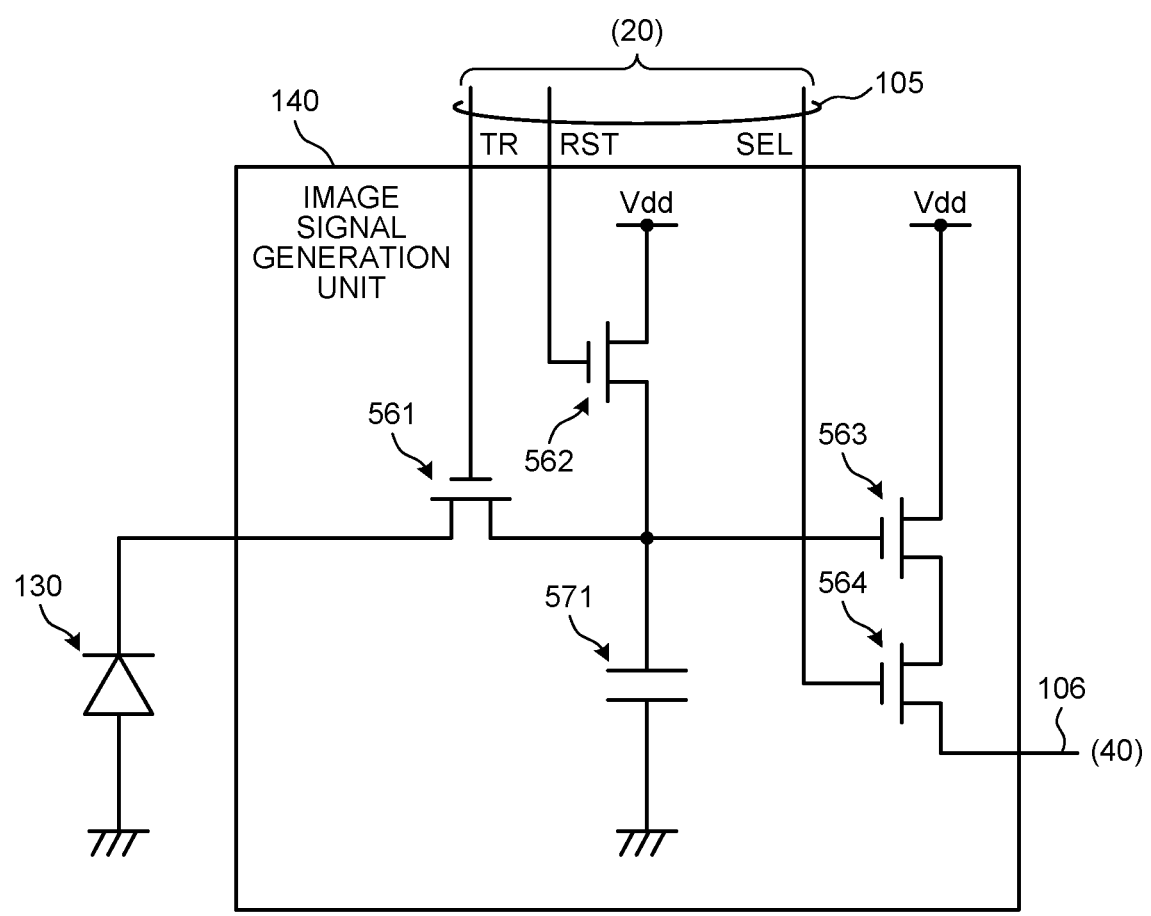
FIG. 18 is a diagram illustrating a configuration example of an image signal generation unit according to the fourth embodiment of the present disclosure.

FIG. 18 is a diagram illustrating a configuration example of the image signal generation unit according to the fourth embodiment of the present disclosure. FIG. 18 is a circuit diagram illustrating the configuration example of the image signal generation unit 140. The image signal generation unit 140 includes a charge holding unit 571 and MOS transistors 561 to 564. For the MOS transistors 561 to 564, n-channel MOS transistors can be used. Note that the photoelectric conversion unit 130 is further illustrated in FIG. 18.

An anode of the photoelectric conversion unit 130 is grounded, and a cathode is connected to a source of the MOS transistor 561. A drain of the MOS transistor 561 is connected to a source of the MOS transistor 562, a gate of the MOS transistor 563, and one end of the charge holding unit 571. The other end of the charge holding unit 571 is grounded. Drains of the MOS transistors 562 and 563 are commonly connected to the power supply line Vdd, and a source of the MOS transistor 563 is connected to a drain of the MOS transistor 564. A source of the MOS transistor 564 is connected to a signal line 106. Gates of the MOS transistors 561, 562, and 564 are connected to a transfer signal line TR, a reset signal line RST, and a selection signal line SEL, respectively. Note that the transfer signal line TR, the reset signal line RST, and the selection signal line SEL configure the signal line 105.

The MOS transistor 561 is a transistor that transfers a charge generated by the photoelectric conversion in the photoelectric conversion unit 130 to the charge holding unit 571. The transfer of the charge by the MOS transistor 561 is controlled by a signal transmitted by the transfer signal line TR. The charge holding unit 571 is a capacitor that holds the charge transferred by the MOS transistor 561. The MOS transistor 563 is a transistor that generates a signal based on the charge held in the charge holding unit 571. The MOS transistor 564 is a transistor that outputs the signal generated by the MOS transistor 563 to the signal line 12 as an image signal. The MOS transistor 564 is controlled by a signal transmitted by the selection signal line SEL.

The MOS transistor 562 is a transistor that resets the charge holding unit 571 by discharging the charge held in the charge holding unit 571 to the power supply line Vdd. The reset by the MOS transistor 562 is controlled by a signal transmitted by the reset signal line RST, and is executed before the MOS transistor 561 transfers the charge. Note that, at the time of this reset, the photoelectric conversion unit 130 can also be reset by making the MOS transistor 561 conductive. In this manner, the image signal generation unit 140 converts the charge generated by the photoelectric conversion unit 130 into the image signal.

Since the configuration of the image pickup element 2 other than this point is similar to that of the first embodiment of the present disclosure, the description thereof will be omitted.

As described above, the image pickup element 2 according to the fourth embodiment of the present disclosure arranges the image signal generation unit 140 in the pixel 100 and generates the image signal in the pixel 100 in which the pixel address event has been detected. By updating the image data using the generated image signal, it is possible to update only the image of the region where the luminance has changed. As a result, the image data can be generated at high speed.

Note that the configuration of the second embodiment can be applied to other embodiments. Specifically, the pixel selection unit 310 in FIG. 14 can be applied to the pixel selection unit 310 in FIGS. 12, 13, and 16.

Note that the configuration of the third embodiment can be applied to other embodiments. Specifically, the specific region address event detection unit 350 and the standby control unit 360 in FIG. 16 can be applied to the pixel selection unit 310 in FIGS. 12 to 14.

Note that the configuration of the fourth embodiment can be applied to other embodiments. Specifically, the image signal generation unit 140 in FIG. 17 can be applied to the pixels 100 in FIGS. 12 and 13.

Effects

The image pickup element 2 is provided with the plurality of pixels 100 including the photoelectric conversion unit that performs photoelectric conversion of incident light, the pixel address event detection unit 120 that is arranged in each of the pixels 100 and detects the pixel address event that is the address event of the pixel 100 based on the change amount of charge generated by the photoelectric conversion, the region address event detection unit 320 that detects the region address event that is the address event in the region based on the change amount of charge generated by the photoelectric conversion in the plurality of pixels 100 included in a predetermined region among the plurality of pixels 100, and the pixel selection unit 310 that selects the pixel 100 based on the detected pixel address event and the region address event and causes the selected pixel to output the detection result of the pixel address event.

As a result, the pixel 100 can be selected based on the region address event and the pixel address event, and the pixel 100 in which the pixel address event is detected can be selected for each predetermined region.

Furthermore, in the image pickup element 2, the plurality of pixels 100 is arranged in the shape of the two-dimensional matrix.

As a result, the pixel 100 in which the pixel address event has been detected can be selected for each region having the matrix shape.

Furthermore, in the image pickup element 2, the predetermined region is arranged for each row of the two-dimensional matrix.

As a result, the pixel 100 in which the pixel address event has been detected can be selected for each row.

Furthermore, in the image pickup element 2, the predetermined region is arranged for each column of the two-dimensional matrix.

As a result, the pixel 100 in which the pixel address event has been detected can be selected for each column.

Furthermore, in the image pickup element 2, the pixel address event detection unit 120 detects the pixel address event based on the change in the photocurrent that is the current according to the charge generated by the photoelectric conversion, and the region address event detection unit 320 detects the region address event based on the change in the photocurrent of each of the plurality of pixels 100 included in the region.

As a result, the address event can be detected by the change in the photocurrent.

Furthermore, in the image pickup element 2, the region address event detection unit 320 detects the region address event based on the change in the total photocurrent of the plurality of pixels 100 included in the region.

As a result, the region address event can be detected by the change in the total photocurrent in the region.

Furthermore, in the image pickup element 2, the pixel selection unit 310 selects the pixel 100 based on the pixel address event detected in the pixel 100 included in the region in which the region address event is detected.

As a result, a high priority can be set to the region in which the region address event is detected.

Furthermore, in the image pickup element 2, the pixel selection unit 310 selects the pixel 100 based on the pixel address event detected in the pixel 100 included in a region different from the region in which the region address event is detected.

As a result, a low priority can be set to the region in which the region address event is detected.

Furthermore, in the image pickup element 2, the pixel selection unit 310 selects the pixel 100 based on the pixel address event detected in a case where no region address event is detected.

As a result, it is possible to detect the pixel address event of the pixel 100 in the region where the region address event is not detected.

Furthermore, the image pickup element 2 further includes the specific region address event detection unit 350 that detects the address event in the specific region based on the change amount of charge generated by the photoelectric conversion in the plurality of pixels 100 included in the specific region of the pixel array unit including the plurality of pixels 100, and the standby control unit 360 that controls the standby state of stopping output of the detection result of the pixel address event in the pixel 100 based on the detection result of the specific region address event detection unit 350.

As a result, it is possible to shift to the standby state when no pixel address event is detected to reduce power consumption.

Furthermore, in the image pickup element 2, the specific region address event detection unit 350 detects the address event with the pixel array unit 10 as the specific region.

As a result, it is possible to shift to the standby state when the pixel address event is not detected in all the pixels 100 of the pixel array unit 10.

Furthermore, in the image pickup element 2, the pixel address event detection unit 120 detects the pixel address event when the change amount of charge generated exceeds the predetermined threshold.

As a result, the pixel address event can be detected based on the predetermined threshold.

Furthermore, in the image pickup element 2, the region address event detection unit 320 detects the region address event in a case where the change amount of charge generated in the plurality of pixels 100 included in the predetermined region exceeds the predetermined threshold.

As a result, the region address event can be detected based on the predetermined threshold.

Furthermore, the image pickup element 2 further includes the image signal generation unit 140 that is arranged in each pixel 100 and generates the image signal that is a signal based on the charge generated by the photoelectric conversion of incident light, and the pixel selection unit 310 causes the image signal generation unit 140 of the selected pixel 100 to output the image signal as the detection result of the pixel address event.

The image signal can thus be generated based on the region address event and the pixel address event.

Furthermore, the image pickup method in the image pickup element 2 includes the pixel address event detection step of detecting the pixel address event that is the address event of the pixel based on the change amount of charge generated by the photoelectric conversion in each of the plurality of pixels 100 including the photoelectric conversion unit 110 that performs the photoelectric conversion of incident light, the region address event detection step of detecting the region address event that is the address event in the region based on the change amount of charge generated by the photoelectric conversion in the plurality of pixels included in the predetermined region among the plurality of pixels 100, the selection step of selecting the pixel 100 based on the pixel address event and region address event detected, and the detection result output step of causing the selected pixel 100 to output the detection result of the pixel address event.

As a result, the pixel 100 can be selected based on the region address event and the pixel address event, and the pixel 100 in which the pixel address event is detected can be selected for each predetermined region.

Note that the effects described in the present specification are merely examples and not limited, and other effects may be provided.

The present technology can also have the following configurations.

(1) An image pickup element comprising:
- a plurality of pixels provided with a photoelectric conversion unit that performs photoelectric conversion of incident light;
- a pixel address event detection unit that is arranged in each of the plurality of pixels and detects a pixel address event, the pixel address event being an address event of the each of the plurality of pixels and being detected based on a change in a charge amount generated by the photoelectric conversion;
- a region address event detection unit that detects a region address event, the region address event being an address event in a predetermined region and being detected based on a change in a charge amount generated by photoelectric conversion in a plurality of pixels included in the predetermined region among the plurality of pixels; and
- a pixel selection unit that selects a pixel among the plurality of pixels based on the pixel address event detected and the region address event detected, and causes the pixel selected to output a detection result of the pixel address event.

(2) The image pickup element according to the above (1), wherein the plurality of pixels is arranged in a shape of a two-dimensional matrix.

(3) The image pickup element according to the above (2), wherein the predetermined region is arranged for each row of the two-dimensional matrix.

(4) The image pickup element according to the above (2), wherein the predetermined region is arranged for each column of the two-dimensional matrix.

(5) The image pickup element according to any one of the above (1) to (4), wherein
the pixel address event detection unit detects the pixel address event based on a change in a photocurrent that is a current corresponding to a charge generated by the photoelectric conversion, and
the region address event detection unit detects the region address event based on a change in a photocurrent of each of the plurality of pixels in the predetermined region.

(6) The image pickup element according to the above (5), wherein the region address event detection unit detects the region address event based on a change in a total photocurrent of the plurality of pixels in the predetermined region.

(7) The image pickup element according to any one of the above (1) to (6), wherein the pixel selection unit selects the pixel based on the pixel address event detected in the pixel in the predetermined region in which the region address event has been detected.

(8) The image pickup element according to any one of the above (1) to (6), wherein the pixel selection unit selects the pixel based on the pixel address event detected in the pixel in a region different from the predetermined region in which the region address event has been detected.

(9) The image pickup element according to any one of the above (1) to (8), wherein, when the region address event is not detected, the pixel selection unit selects the pixel based on the pixel address event detected.

(10) The image pickup element according to any one of the above (1) to (9), further comprising:
a specific region address event detection unit that detects the address event in a specific region, the address event being detected based on a change in a charge amount generated by photoelectric conversion in a plurality of pixels in the specific region among the plurality of pixels, the specific region being arranged in a pixel array unit including the plurality of pixels; and
a standby control unit that controls a standby state in which an output, from the pixel, of the detection result of the pixel address event is stopped based on a detection result of the specific region address event detection unit.

(11) The image pickup element according to the above (10), wherein the specific region address event detection unit detects the address event in the pixel array unit as the specific region.

(12) The image pickup element according to any one of the above (1) to (11), wherein the pixel address event detection unit detects the pixel address event when the charge amount generated changes exceeding a predetermined threshold.

(13) The image pickup element according to any one of the above (1) to (12), wherein the region address event detection unit detects the region address event when the charge amount generated in the plurality of pixels in the predetermined region changes exceeding a predetermined threshold.

(14) The image pickup element according to any one of the above (1) to (13), further comprising:
an image signal generation unit that is arranged in each of the plurality of pixels and generates an image signal, the image signal being a signal based on a charge generated by the photoelectric conversion of the incident light, wherein
the pixel selection unit causes the image signal generation unit of the pixel selected to output the image signal as the detection result of the pixel address event.

(15) An image pickup method comprising:
a pixel address event detection step of detecting a pixel address event of a pixel among a plurality of pixels provided with a photoelectric conversion unit that performs photoelectric conversion of incident light, the pixel address event being detected based on a change in a charge amount generated by the photoelectric conversion;
a region address event detection step of detecting a region address event in a plurality of pixels in a predetermined region among the plurality of pixels, the region address event being detected based on a change in a charge amount generated by photoelectric conversion in the plurality of pixels in the predetermined region;
a selection step of selecting the pixel based on the pixel address event detected and the region address event detected; and
a detection result output step of causing the pixel selected to output a detection result of the pixel address event.

REFERENCE SIGNS LIST

1 IMAGE PICKUP APPARATUS
2 IMAGE PICKUP ELEMENT
10 PIXEL ARRAY UNIT
30 ARBITER
40 SIGNAL PROCESSING UNIT
100 PIXEL
110, 130 PHOTOELECTRIC CONVERSION UNIT
120 PIXEL ADDRESS EVENT DETECTION UNIT
140 IMAGE SIGNAL GENERATION UNIT
310 PIXEL SELECTION UNIT
311 REGION ARBITER
312 PIXEL ARBITER
320, 330, 340 REGION ADDRESS EVENT DETECTION UNIT
350 SPECIFIC REGION ADDRESS EVENT DETECTION UNIT
360 STANDBY CONTROL UNIT
591 to 593 REGION

The invention claimed is:

1. An image pickup element comprising:
a plurality of pixels provided with a photoelectric conversion unit that performs photoelectric conversion of incident light;
a pixel address event detection unit that is arranged in each of the plurality of pixels and detects a pixel address event, the pixel address event being an address event of the each of the plurality of pixels and being detected based on a change in a charge amount generated by the photoelectric conversion;
a region address event detection unit that detects a region address event, the region address event being an address event in a predetermined region and being detected based on a change in a charge amount generated by photoelectric conversion in a plurality of pixels included in the predetermined region among the plurality of pixels; and
a pixel selection unit that selects a pixel among the plurality of pixels based on the pixel address event detected and the region address event detected, and causes the pixel selected to output a detection result of the pixel address event.

2. The image pickup element according to claim 1, wherein the plurality of pixels is arranged in a shape of a two-dimensional matrix.

3. The image pickup element according to claim 2, wherein the predetermined region is arranged for each row of the two-dimensional matrix.

4. The image pickup element according to claim 2, wherein the predetermined region is arranged for each column of the two-dimensional matrix.

5. The image pickup element according to claim 1, wherein
the pixel address event detection unit detects the pixel address event based on a change in a photocurrent that is a current corresponding to a charge generated by the photoelectric conversion, and
the region address event detection unit detects the region address event based on a change in a photocurrent of each of the plurality of pixels in the predetermined region.

6. The image pickup element according to claim 5, wherein the region address event detection unit detects the region address event based on a change in a total photocurrent of the plurality of pixels in the predetermined region.

7. The image pickup element according to claim 1, wherein the pixel selection unit selects the pixel based on the pixel address event detected in the pixel in the predetermined region in which the region address event has been detected.

8. The image pickup element according to claim 1, wherein the pixel selection unit selects the pixel based on the pixel address event detected in the pixel in a region different from the predetermined region in which the region address event has been detected.

9. The image pickup element according to claim 1, wherein, when the region address event is not detected, the pixel selection unit selects the pixel based on the pixel address event detected.

10. The image pickup element according to claim 1, further comprising:
a specific region address event detection unit that detects the address event in a specific region, the address event being detected based on a change in a charge amount generated by photoelectric conversion in a plurality of pixels in the specific region among the plurality of pixels, the specific region being arranged in a pixel array unit including the plurality of pixels; and
a standby control unit that controls a standby state in which an output, from the pixel, of the detection result of the pixel address event is stopped based on a detection result of the specific region address event detection unit.

11. The image pickup element according to claim 10, wherein the specific region address event detection unit detects the address event in the pixel array unit as the specific region.

12. The image pickup element according to claim 1, wherein the pixel address event detection unit detects the pixel address event when the charge amount generated changes exceeding a predetermined threshold.

13. The image pickup element according to claim 1, wherein the region address event detection unit detects the region address event when the charge amount generated in the plurality of pixels in the predetermined region changes exceeding a predetermined threshold.

14. The image pickup element according to claim 1, further comprising:
an image signal generation unit that is arranged in each of the plurality of pixels and generates an image signal, the image signal being a signal based on a charge generated by the photoelectric conversion of the incident light, wherein
the pixel selection unit causes the image signal generation unit of the pixel selected to output the image signal as the detection result of the pixel address event.

15. An image pickup method comprising:
a pixel address event detection step of detecting a pixel address event of a pixel among a plurality of pixels provided with a photoelectric conversion unit that performs photoelectric conversion of incident light, the pixel address event being detected based on a change in a charge amount generated by the photoelectric conversion;
a region address event detection step of detecting a region address event in a plurality of pixels in a predetermined region among the plurality of pixels, the region address event being detected based on a change in a charge amount generated by photoelectric conversion in the plurality of pixels in the predetermined region;
a selection step of selecting the pixel based on the pixel address event detected and the region address event detected;
and a detection result output step of causing the pixel selected to output a detection result of the pixel address event.

* * * * *